(12) United States Patent
Ueno

(10) Patent No.: US 12,437,117 B2
(45) Date of Patent: Oct. 7, 2025

(54) MANAGEMENT SYSTEM THAT DETERMINES AUTHENTICITY OF CONTENTS, COMMUNICATION APPARATUS, MANAGEMENT METHOD, METHOD OF CONTROLLING COMMUNICATION APPARATUS, AND STORAGE MEDIUM

(71) Applicant: CANON KABUSHIKI KAISHA, Tokyo (JP)

(72) Inventor: Daiyu Ueno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 18/585,912

(22) Filed: Feb. 23, 2024

(65) Prior Publication Data

US 2024/0296250 A1 Sep. 5, 2024

(30) Foreign Application Priority Data

Mar. 2, 2023 (JP) ................................ 2023-031655
Jan. 10, 2024 (JP) ................................ 2024-001764

(51) Int. Cl.
*G06F 21/64* (2013.01)

(52) U.S. Cl.
CPC ................................ *G06F 21/64* (2013.01)

(58) Field of Classification Search
CPC ...................................................... G06F 21/64
USPC .......................................................... 726/30
See application file for complete search history.

(56) References Cited

U.S. PATENT DOCUMENTS

| | | | |
|---|---|---|---|
| 6,557,102 B1 * | 4/2003 | Wong ..................... | G06F 21/608 713/176 |
| 11,368,289 B1 * | 6/2022 | Kvochko ................ | G06V 20/46 |
| 11,586,724 B1 * | 2/2023 | Gallagher .............. | H04L 9/3239 |
| 12,050,559 B2 * | 7/2024 | Ohashi ................. | G06F 16/1834 |
| 2004/0054906 A1 * | 3/2004 | Carro .................... | H04L 9/3236 713/176 |
| 2017/0372322 A1 * | 12/2017 | Morey ................ | G06Q 30/0205 |
| 2021/0075788 A1 * | 3/2021 | Pasterk ................. | H04L 9/3239 |

(Continued)

FOREIGN PATENT DOCUMENTS

JP 2017-204706 11/2017

OTHER PUBLICATIONS

U.S. Appl. No. 18/409,706, filed Jan. 10, 2024.

*Primary Examiner* — Kaylee J Huang
(74) *Attorney, Agent, or Firm* — Venable LLP

(57) ABSTRACT

A management system that manages contents associated with a hash value registered in a blockchain. A controller of the management system receives contents as a target of authenticity determination and an identification number for identifying authentic contents used as a reference for determining the authenticity of the target contents. The controller determines the authenticity of the contents as the target of the authenticity determination by comparing a hash value generated from the contents as the target of the authenticity determination and a hash value, registered in the blockchain, of authentic contents indicated by the received identification number, and notifies a result of the authenticity determination. In a case where it is determined that the contents as the target of the authenticity determination are not authentic, the controller notifies information on the authentic contents associated with the identification number.

26 Claims, 23 Drawing Sheets

(56) References Cited

U.S. PATENT DOCUMENTS

| | | | |
|---|---|---|---|
| 2021/0195055 A1* | 6/2021 | Sardesai | H04N 1/00875 |
| 2023/0006839 A1* | 1/2023 | Kasamatsu | H04L 9/50 |
| 2023/0121095 A1 | 4/2023 | Ueno et al. | G06F 21/62 |
| 2025/0021673 A1* | 1/2025 | Miyashita | G06Q 30/0185 |
| 2025/0209142 A1* | 6/2025 | Inagaki | G06Q 30/06 |

* cited by examiner

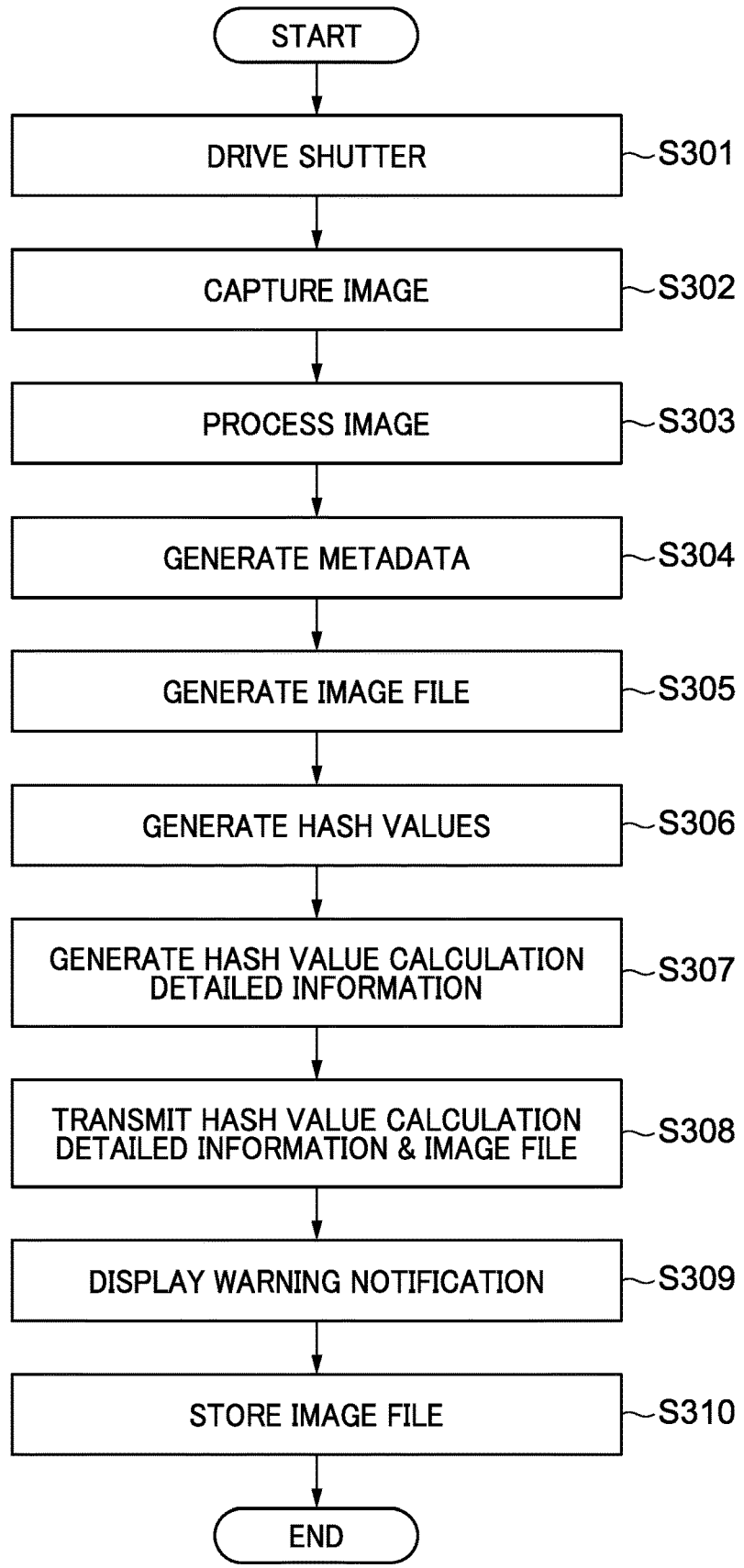

FIG. 5

| BLOCK ID | AUTHENTICITY GUARANTEE NUMBER | IMAGE FILE NAME | IMAGE NOTIFICATION SETTING |
|---|---|---|---|
| 0 | 0000000000000000 | IMG_0000.JPG | ENABLED |
| 1 | 5432456667777773 | IMG_0001.JPG | DISABLED |
| 2 | 0988501939374728 | IMG_0002.JPG | ENABLED |
| 3 | 1111220034355050 | IMG_0003.JPG | ENABLED |
| 4 | 3322434456777888 | IMG_0004.JPG | ENABLED |

FIG. 10A
Result of authenticity confirmation:
The image is determined as an "authentic image" which has not been altered.
FIG. 10B
Result of authenticity confirmation:
The image data has been altered.
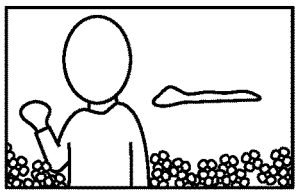
Transmitted image
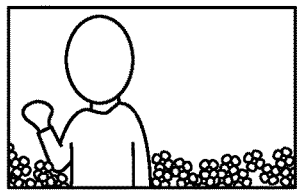
Authentic image
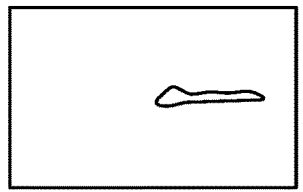
Difference image

FIG. 10C

Result of authenticity confirmation:
The metadata has been altered.

| Photographer: Taro Yamada<br>Photographing place: Tokyo<br>Photographing time: 12:00 | Photographer: Taro Tanaka<br>Photographing place: Tokyo<br>Photographing time: 12:00 | Photographer: Tanaka<br>Photographing place: Tokyo<br>Photographing time: 12:00 |
|---|---|---|
| Transmitted metadata | Authentic metadata | Difference metadata |

FIG. 10D

Rresult of authenticity confirmation: The image and the metadata have been altered.

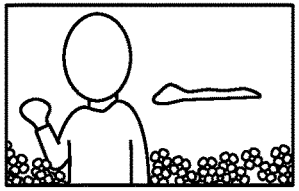 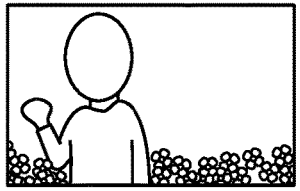 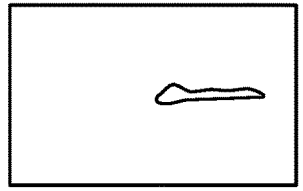

| Photographer: Taro Yamada<br>Photographing place: Tokyo<br>Photographing time: 12:00 | Photographer: Taro Tanaka<br>Photographing place: Tokyo<br>Photographing time: 12:00 | Photographer: Taro Tanaka<br>Photographing place: Tokyo<br>Photographing time: 12:00 |
|---|---|---|
| Transmitted image | Authentic image | Difference image |

Photo of my son 0.5ETH

Bid

Exhibition comment
This is a photo of my son, photographed by myself.
If you want to know that this is an exhibit of the photographer himself/herself, please make a confirmation on the following web site using the authenticity guarantee No. 5432456667777773.
https://shinsei.kakunin/ ⌒―1701

Contract address: 0x495f7b5e2214
Token ID: 000111233
Owner: YAMADA TAROU
Creator: SUZUKI JIROU

FIG. 18

| BLOCK ID | AUTHENTICITY GUARANTEE NUMBER | IMAGE FILE NAME | IMAGE NOTIFICATION SETTING | NFT CONTRACT ADDRESS | NFT TOKEN ID | NFT SALES URL | SALES SITE ACCOUNT NAME |
|---|---|---|---|---|---|---|---|
| 0 | 0000000000000000 | IMG_0000.JPG | ENABLED | 0x4957b5e2212 | 0001111111 | https://nft.sale/01/ | SUZUKI JIROU |
| 1 | 5432456667777773 | IMG_0001.JPG | DISABLED | 0x4957b5e2213 | 0001111233 | https://nft.sale/02/ | SUZUKI JIROU |
| 2 | 0988501939374728 | IMG_0002.JPG | ENABLED | 0x4957b5e2214 | 0001111234 | https://nft.sale/03/ | YAMADA JIROU |
| 3 | 1111220034355050 | IMG_0003.JPG | ENABLED | 0x4957b5e2215 | 0001111277 | https://nft.sale/04/ | TANAKA SABUROU |
| 4 | 3322434456777888 | IMG_0004.JPG | ENABLED | 0x4957b5e2216 | 0001111238 | https://nft.sale/05/ | SUZUKI SABUROU |

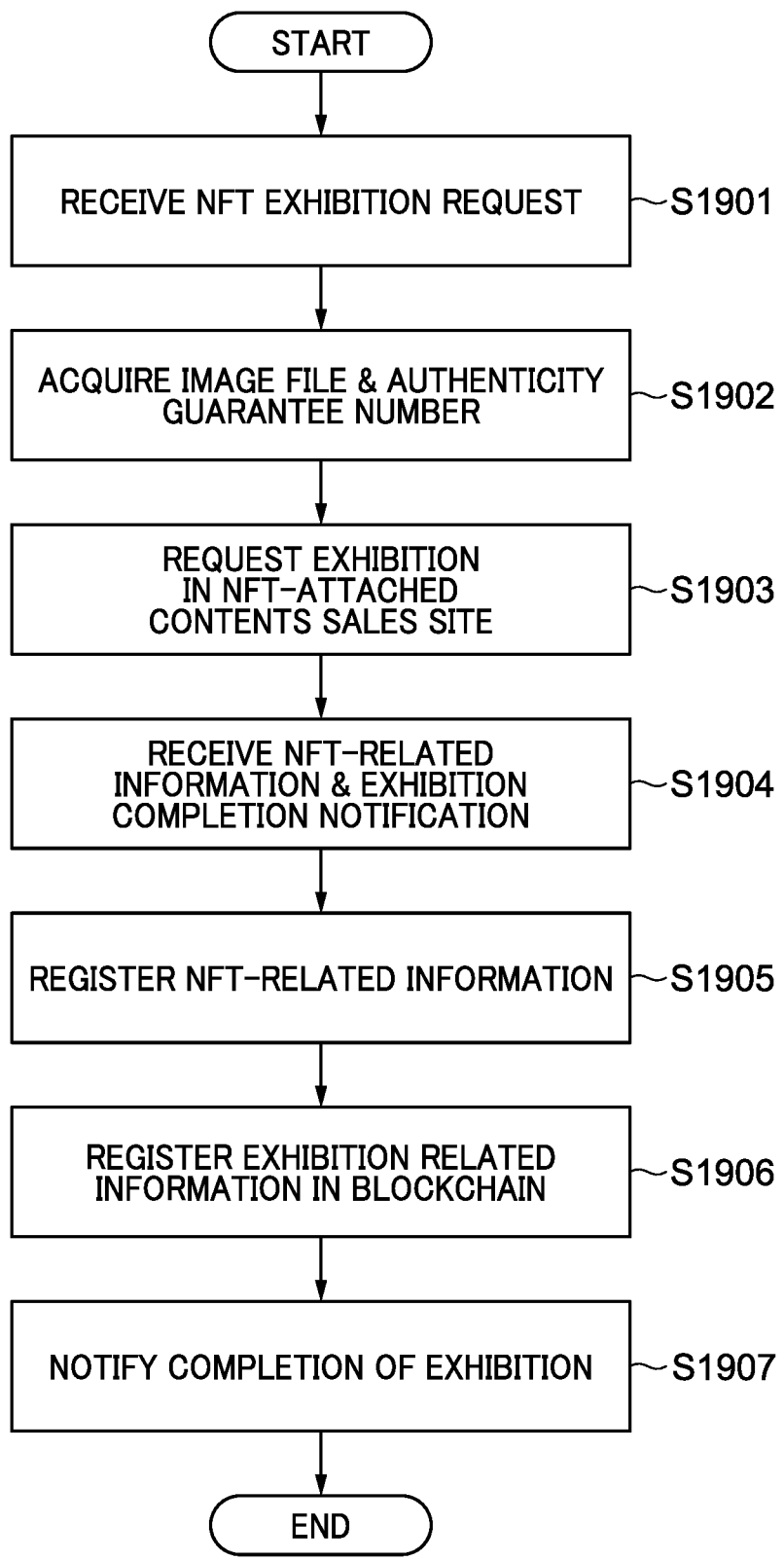

FIG. 21A
The transmitted image is authentic.
The NFT-RELATED information is set forth in lower part.
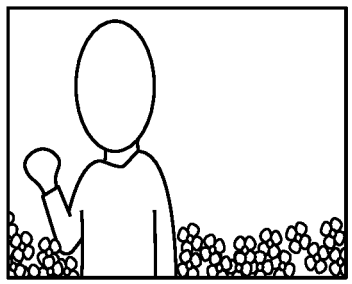
Contract address:0x495f7b5e2214
Token ID:000111233
Creator:SUZUKI JIROU
Sales site: NFT sales
URL of the sales site:https://nft.sale/02/
FIG. 21B
The transmitted image has been altered unintentionally
by the photographer.
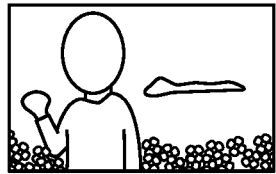
Transmitted image
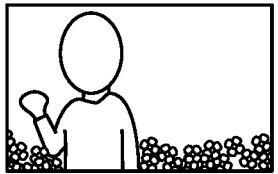
Authentic image
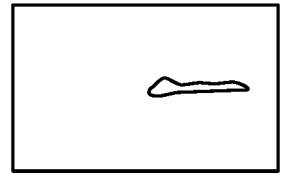
Difference image

MANAGEMENT SYSTEM THAT DETERMINES AUTHENTICITY OF CONTENTS, COMMUNICATION APPARATUS, MANAGEMENT METHOD, METHOD OF CONTROLLING COMMUNICATION APPARATUS, AND STORAGE MEDIUM

BACKGROUND OF THE INVENTION

Field of the Invention

The present invention relates to a management system that determines the authenticity of contents, a communication apparatus, a management method, a method of controlling the communication apparatus, and a storage medium.

Description of the Related Art

In recent years, information sharing via the Internet and the SNS is increasingly becoming more active, and we are in an age where everyone can view and transmit information. Under such circumstances, a technique for altering a digital image has been further developed, and hence it has become difficult for a user viewing information to confirm the authenticity of viewed contents, and a problem, such as fake news, has become serious. To cope with such a problem, there is an increasing demand for a mechanism that guarantees the authenticity (no alteration or tampering) of a digital image.

It is under consideration to use, as the mechanism that guarantees the authenticity of a digital image, a blockchain technique which is widely used in industries, such as a financial service. The blockchain technique can prevent tampering of digital data at low costs in a decentralized fashion.

For example, a management system using the blockchain technique registers a hash value of contents generated by a contents generation apparatus and metadata associated with the contents in a blockchain as information on the contents. With this, the authenticity of the contents from the time of generation thereof is guaranteed (see, for example, Japanese Laid-Open Patent Publication (Kokai) No. 2017-204706). This makes it possible to acquire the contents which have not been altered since the time of generation thereof from this management system and disclose the acquired contents, for example, via the Internet and the SNS.

It is envisaged to determine the authenticity of the contents by using the information on the contents, which is registered in the blockchain, and notify a result of the determination. If a result of the determination of the authenticity (authenticity determination) indicates authenticity, a user can obtain a feeling of satisfaction only by receiving a notification of the determination result indicating this fact, but if a result of the authenticity determination indicates inauthenticity, a user cannot know how the contents have been altered only by receiving the notification of the determination result indicating inauthenticity, and cannot obtain the feeling of satisfaction.

SUMMARY OF THE INVENTION

The present invention provides a management system that enables a user to know, in a case where a result of authenticity determination indicates inauthenticity, actual data before alteration, a communication apparatus, a management method, a method of controlling the communication apparatus, and a storage medium.

In a first aspect of the present invention, there is provided a management system that manages contents associated with a hash value registered in a blockchain, including a reception unit configured to receive contents as a target of authenticity determination and an identification number for identifying authentic contents used as a reference for determining authenticity of the target contents, a determination unit configured to determine the authenticity of the contents as the target of the authenticity determination by comparing a hash value which is generated from the contents as the target of the authenticity determination and a hash value of the authentic contents indicated by the identification number, which is registered in the blockchain, and a notification unit configured to perform notification of a result of the authenticity determination, wherein in a case where it is determined that the contents as the target of the authenticity determination are not authentic, the notification unit performs notification of information on authentic contents associated with the identification number.

In a second aspect of the present invention, there is provided a communication apparatus including a reception unit configured to receive contents formed by a plurality of data items and an identification number for identifying authentic contents used as a reference to determine the authenticity of the contents, a determination unit configured to determine whether or not the contents have been altered, based on the plurality of data items, and a notification unit configured to perform notification of a result of the determination performed by the determination unit, wherein in a case where it is determined that the contents have not been altered, the notification unit performs notification of a result of the determination based on the plurality of data items, whereas in a case where it is determined that the contents have been altered, the notification unit performs notification of a result of the determination based on information on the authentic contents acquired from a management system that manages the authentic contents.

According to the present invention, it is possible to know actual data before alteration in a case where a result of authenticity determination indicates inauthenticity.

Further features of the present invention will become apparent from the following description of exemplary embodiments (with reference to the attached drawings).

BRIEF DESCRIPTION OF THE DRAWINGS

FIG. 3 is a flowchart of a data transmission process performed by the image capturing apparatus appearing in FIG. 1.

FIG. 5 is a diagram showing an example of the configuration of an image database appearing in FIG. 4.

FIGS. 10A to 10D are diagrams each showing an example of a result of determination by the authenticity determination process, which is displayed on a WEB page of the management system appearing in FIG. 1.

FIG. 18 is a diagram showing an example of the configuration of an image database included in the management system according to the third embodiment.

FIG. 19 is a flowchart of an image file exhibition process performed by the management system according to the third embodiment.

FIGS. 21A and 21B are diagrams each showing an example of the display on a display section of the communication apparatus in the third embodiment.

DESCRIPTION OF THE EMBODIMENTS

The present invention will now be described in detail below with reference to the accompanying drawings showing embodiments thereof. Note that an image capturing apparatus will be described as an example of a contents generation apparatus, but the contents generation apparatus is not limited to the image capturing apparatus. For example, the contents generation apparatus can be any other apparatus that generates contents, such as an apparatus that generates voice data of a recorded voice, an apparatus that generates image data of an illustrated image digitally drawn by a user and the like, or an apparatus that generates data of music composed by a user.

First, a first embodiment of the present invention will be described. In the first embodiment, a management system 101 according to the present embodiment determines the authenticity of an image file.

Figure 1:
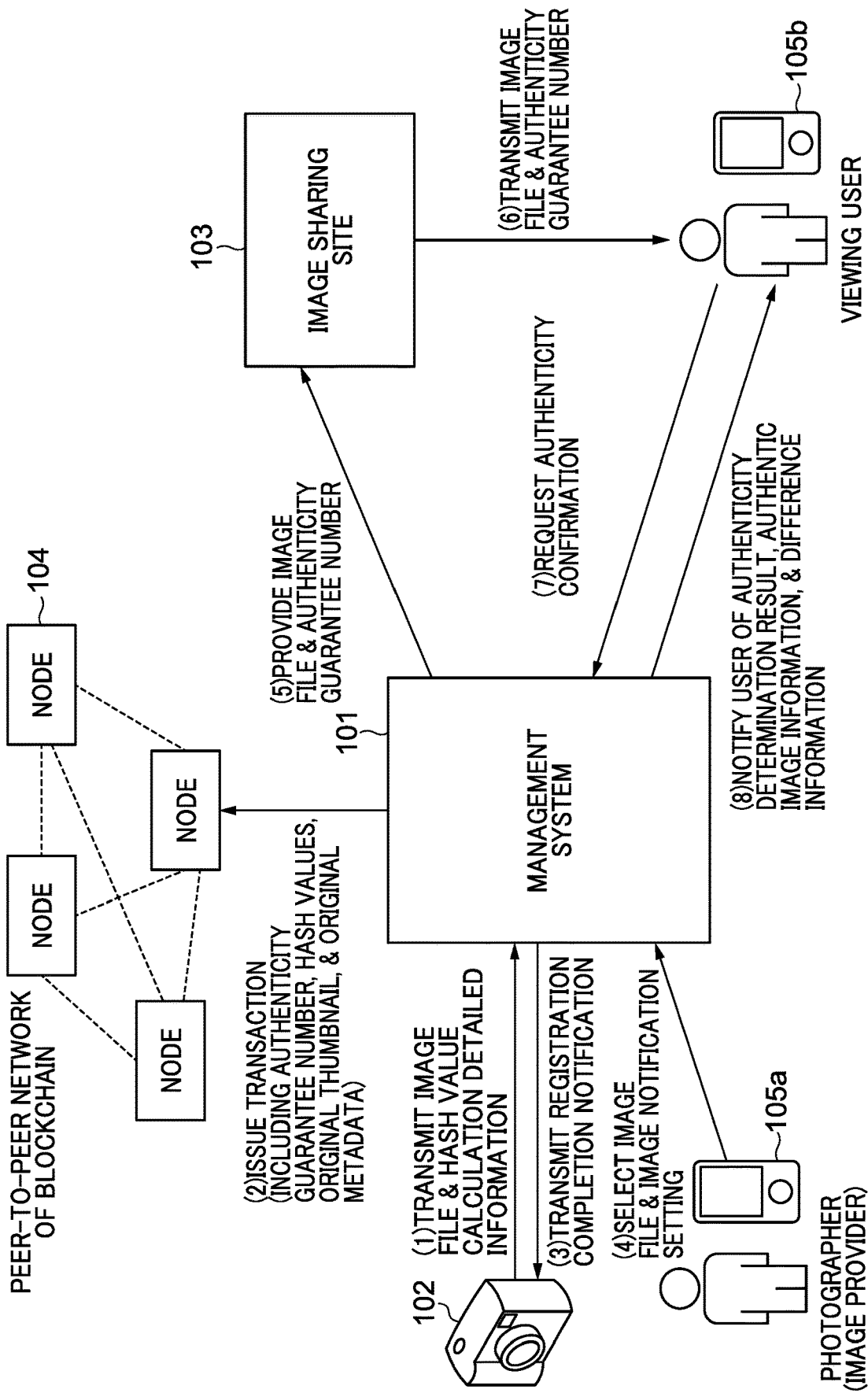
FIG. 1 is a diagram useful in explaining the functions of a management system according to a first embodiment of the present invention.

FIG. 1 is a diagram useful in explaining the functions of the management system 101 according to the present embodiment.

The management system 101 has the function of managing contents acquired from an external apparatus, such as an image capturing apparatus 102, via the Internet and the like.

The management system 101 is realized by one or more computer apparatuses. Note that although in the present embodiment, a description will be given of a configuration in which the management system 101 further communicates with a peer-to-peer network 104 of a blockchain to use the blockchain, this is not limitative, but the management system 101 can be realized by using any suitable one of other networks.

As shown in FIG. 1, when the image capturing apparatus 102 performs a photographing operation, the image capturing apparatus 102 transmits an image file obtained through this photographing operation and hash value calculation detailed information in a state associated with each other, to the management system 101 (step (1)).

The image file includes image data, metadata, original metadata, and an original thumbnail. The image data is still image data or moving image data. Note that in the present embodiment, the original metadata (first metadata) and the metadata (second metadata) are generated so as to make it possible to confirm a difference in attribute information between an image originally photographed and an image formed by editing the image originally photographed. The original metadata includes the attribute information at the moment of photographing. The attribute information indicates a photographer of image data, a photographing time, a photographing place, a model of the image capturing apparatus, photographing settings, and so forth. On the other hand, the metadata includes the current attribute information. For example, in a case where the image data is image data which has been edited by changing a setting from the photographing time, the metadata is different from the original metadata in the information concerning the setting. Note that in the present embodiment, in a case where the image data is image data generated at the photographing time, the contents of the metadata and the contents of the original metadata are the same. The original thumbnail is thumbnail data obtained by reducing the image data, i.e. the image data obtained by photographing performed with the photographing settings included in the original metadata.

Further, the image file includes hash values and signature values. The hash values are obtained by applying a hash function to the image data, the metadata, the original thumbnail, and the original metadata, included in the image file, respectively. The signature values are obtained by encoding these hash values with a secret key by using an encoding technique, such as the technique of digital signature. When encoding the hash values, the hash values can be collectively encoded by treating the hash values as one set, or each hash value can be individually encoded by using a different key. Note that although in the present embodiment, the description will be given of the configuration in which the hash values and the signature values are included in the image file, the hash values and the signature values can be transmitted as a file separate from the image file.

The management system 101 generates hash values by applying a hash function to the image data, the metadata, the original thumbnail, and the original metadata, included in the received image file, respectively. Further, the management system 101 decodes the signature values included in the received image file by using a public key. The management system 101 compares the generated hash values and the decoded hash values, whereby it is possible to determine whether or not the image data, the metadata, the original thumbnail, and the original metadata have been altered during communication.

The hash value calculation detailed information is information describing, in a case where image data included in an image file is thinned and a hash function is applied to the thinned image data, information indicating how the image data is thinned. Note that as the algorithm of the hash function to be used, only an initially set algorithm can be used, or one of a plurality of algorithms, such as Secure Hash Algorithm (SHA) 256 and Message Digest Algorithm (MD) 5, can be selected. In the latter case, an algorithm used for hash value calculation is also described in the hash value calculation detailed information. For example, the SHA256 used for hashing image data is an algorithm in which calculation is repeatedly performed on the image data on a 64 bytes basis from the top of the data to the end of the data, to thereby generate a hash value of 32 bytes (256 bits). If from the top of the image data, an operation of using 64 bytes for calculation and skipping the next 64 bytes without using them for calculation is repeatedly performed on the entirety of the image data, the calculation amount is reduced to half. The hash value calculation detailed information in this case can be described, for example, as "Algorithm, SHA256, Read, 64, Skip, 64" by using the CSV file format. Further, in a case where the image data is moving image data, the hash function can be applied to every other frame thereof. The hash value calculation detailed information in this case can be described, for example, as "Algorithm, SHA256, SkipFrame, 1," by using the CSV file format. Further, in combination with this, it is possible to thin data in each frame without using all of the data in the frame. The hash value calculation detailed information in this case can be described as "Algorithm, SHA256, SkipFrame, 1, Read, 64, Skip, 64" by using the CSV file format.

Note that the format of the hash value calculation detailed information is not limited to the CSV file format. For example, the hash value calculation detailed information can be described in a file format which is widely used, such as the JSON file format, or can be described in a custom file format.

Note that although in the present embodiment, the description is given of the configuration in which the image capturing apparatus 102 generates hash values and transmits the generated hash values to the management system 101, this is not limitative, but for example, the management system 101 can generate hash values based on an image file acquired from the image capturing apparatus 102.

Upon receipt of the image file and the hash value calculation detailed information from the image capturing apparatus 102, the management system 101 according to the present embodiment generates an authenticity guarantee number which is a unique number in the management system 101. The authenticity guarantee number is an identification number for uniquely identifying the image file. Note that this authenticity guarantee number can be included in the image file.

The management system 101 generates transaction data including information on an image file, such as original metadata, an original thumbnail, hash values, hash value calculation detailed information, and an image link as a reference address of a server storing a received image file, and an authenticity guarantee number, and connects a block in which the generated transaction data has been written, to the blockchain. Specifically, the management system 101 issues the generated transaction data to broadcast the transaction data to one or more computers (nodes) participating in the peer-to-peer network 104 of the blockchain (step (2)). With this, the transaction data is temporarily stored in a transaction pool, and when the transaction data is approved by miners, verification is completed. Then, a block in which the transaction data has been written is generated and is added to the end of the blockchain. With this, the information on the image file is registered in the blockchain.

After connecting the block in which the transaction data has been written to the blockchain, the management system 101 stores (provides) the image file and the authenticity guarantee number in a state associated with each other, in an image database 407, described hereinafter with reference to FIG. 4. Then, the management system 101 transmits a registration completion notification indicating that the processing for registering the information on the image file in the blockchain is completed to the image capturing apparatus 102 (step (3)).

Then, the management system 101 prompts a user (such as a photographer or an image provider) to select an image file to be disclosed on an image sharing site 103, from a plurality of image files registered in the image database 407 (step (4)). Specifically, the user can access a WEB page of the management system 101 from a communication apparatus 105a operated by the user and select the image file to be disclosed on the image sharing site 103 from the WEB page. Further, the user can also set a setting value of enabling/disabling image notification setting with respect to the selected image file. The setting value of the image notification setting is registered in the image database 407. The management system 101 controls whether or not to provide (notify) authentic image information, described hereinafter, and difference information, described hereinafter, to a viewing user based on the setting value of the image notification setting when an authenticity confirmation request, described hereinafter, is received. Then, the management system 101 provides the image file selected by the user and the authenticity guarantee number associated with the selected image file to the image sharing site 103 (step (5)), At the same time, the management system 101 notifies the communication apparatus 105a that the image file selected by the user in the step (4) has become capable of being disclosed on the image sharing site 103.

The image sharing site 103 controls the display on the WEB page thereof such that the authenticity guarantee number provided from the management system 101 together with the image file is displayed, for example, in the vicinity of the image file. Note that the above-mentioned display position of the authenticity guarantee number is an example, and the authenticity guarantee number is only required to be displayed in a position where a viewing user of the image sharing site 103 can recognize that it is the authenticity guarantee number associated with the image file. Further, the authenticity guarantee number can be included in the image file.

There is a case where a viewing user of the image sharing site 103 desires to confirm that an image file displayed on the WEB page of the image sharing site 103 has not been altered from the time when the image file was created by photographing. In this case, first, the viewing user acquires (downloads) the image file and the authenticity guarantee number associated with this image file from the image sharing site 103, using a communication apparatus 105b (step (6)). Specifically, the viewing user accesses the WEB page of the image sharing site 103 from the communication apparatus 105b, selects an image file disclosed on the WEB page, and instructs download thereof. Upon receipt of this instruction, the image sharing site 103 transmits the selected image file and the authenticity guarantee number to the communication apparatus 105b.

When the download is completed, the communication apparatus 105b transmits a request for confirming the authenticity of the selected image file to the management system 101 together with the acquired image file and authenticity guarantee number (step (7)). In the present embodiment, the authenticity confirmation request is performed by attaching the image file and the authenticity guarantee number, which have been acquired from the image sharing site 103, to an entry form provided by the management system 101, by using the communication apparatus 105b. However, the method of the authenticity confirmation request is not limited to the method used in the present embodiment, but, for example, the authenticity confirmation request can be performed by transmitting an e-mail to which the image file and the authenticity guarantee number are attached, to the management system 101.

When the authenticity confirmation request is transmitted from the communication apparatus 105b, the management system 101 performs determination of the authenticity of the image file of which is the authenticity is requested to be confirmed. Note that although in this example, the authenticity determination is performed when the management system 101 receives the authenticity confirmation request with respect to the image data displayed on the image sharing site 103 from the communication apparatus 105b of the viewing user of the image sharing site 103, this is not limitative. For example, the management system 101 can periodically perform the authenticity determination based on the image database 407. The management system 101 displays a result of the authenticity determination, the authentic image information, described hereinafter, the difference information, described hereinafter, and so forth, on the WEB page of the management system 101 or notifies the communication apparatus 105b of these information items using an e-mail (step (8)).

Figure 2A:
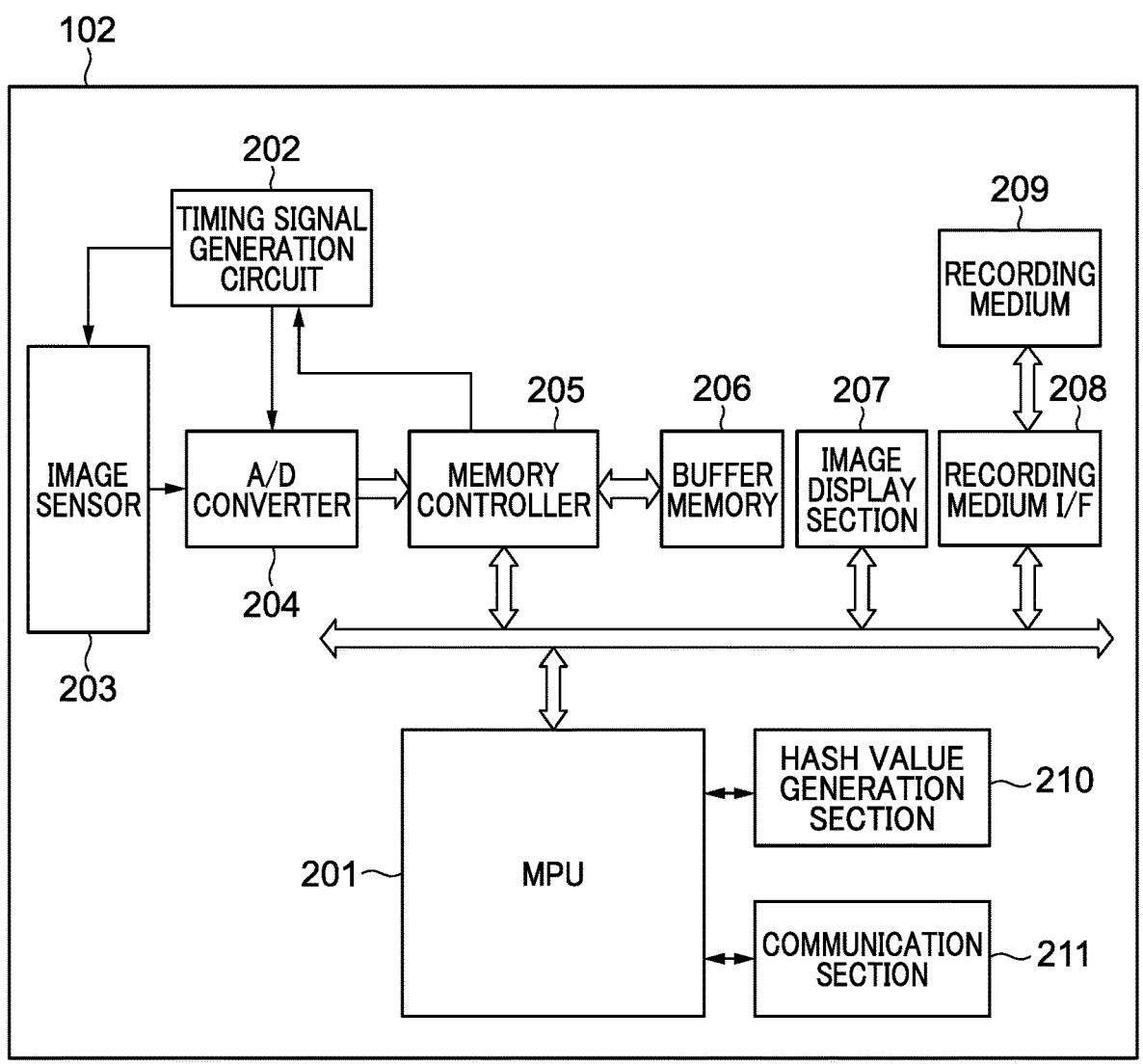
FIGS. 2A and 2B are schematic block diagrams showing the configurations of an image capturing apparatus and a communication apparatus, appearing in FIG. 1, respectively.

FIG. 2A is a schematic block diagram showing the configuration of the image capturing apparatus 102 appearing in FIG. 1. The image capturing apparatus 102 is a camera, such as a digital camera or a digital video camera, or an electronic device equipped with a camera function, such as a mobile phone equipped with the camera function or a computer with a camera.

Referring to FIG. 2A, the image capturing apparatus 102 includes an MPU 201, a timing signal generation circuit 202, an image sensor 203, an analog-to-digital converter 204, a memory controller 205, a buffer memory 206, and an image display section 207. Further, the image capturing apparatus 102 includes a recording medium interface 208, a recording medium 209, a hash value generation section 210, and a communication section 211.

The MPU 201 is a micro controller for performing control on the system of the image capturing apparatus 102, such as control of a photographing sequence.

The timing signal generation circuit 202 generates a timing signal necessary for operating the image sensor 203.

The image sensor 203 is a CCD or CMOS sensor that converts light reflected from an object to electrical signals (analog image data) and outputs the electrical signals to the analog-to-digital converter 204.

The analog-to-digital converter 204 converts the analog image data read out from the image sensor 203 to digital image data. This digital image data is hereinafter simply referred to as the "image data".

The memory controller 205 controls reading and writing of an image file from and into the buffer memory 206, a refresh operation of the buffer memory 206, and so forth. This image file is an image file generated by the MPU 201, as described hereinafter, which is formed by adding the metadata, the original thumbnail, and the original metadata to the image data. Details of the image file will be described hereinafter.

The buffer memory 206 stores the image file.

The image display section 207 displays the image file stored in the buffer memory 206.

The recording medium interface 208 is for controlling reading and writing of data from and into the recording medium 209.

The recording medium 209 is a storage medium which can be inserted and removed into and from the image capturing apparatus 102, such as a memory card, and stores programs, image files, and the like.

The hash value generation section 210 applies a hash function to the image data, the metadata, the original thumbnail, and the original metadata, included in the image file stored in the buffer memory 206 to generate (calculate) hash values. Note that not the hash value generation section 210, but the MPU 201 may generate hash values. Further, the hash values may be generated by applying the hash function not to each data included in the image file but to the image file.

The communication section 211 is connected to the Internet and transmits and receives data to and from an external apparatus.

Figure 2B:
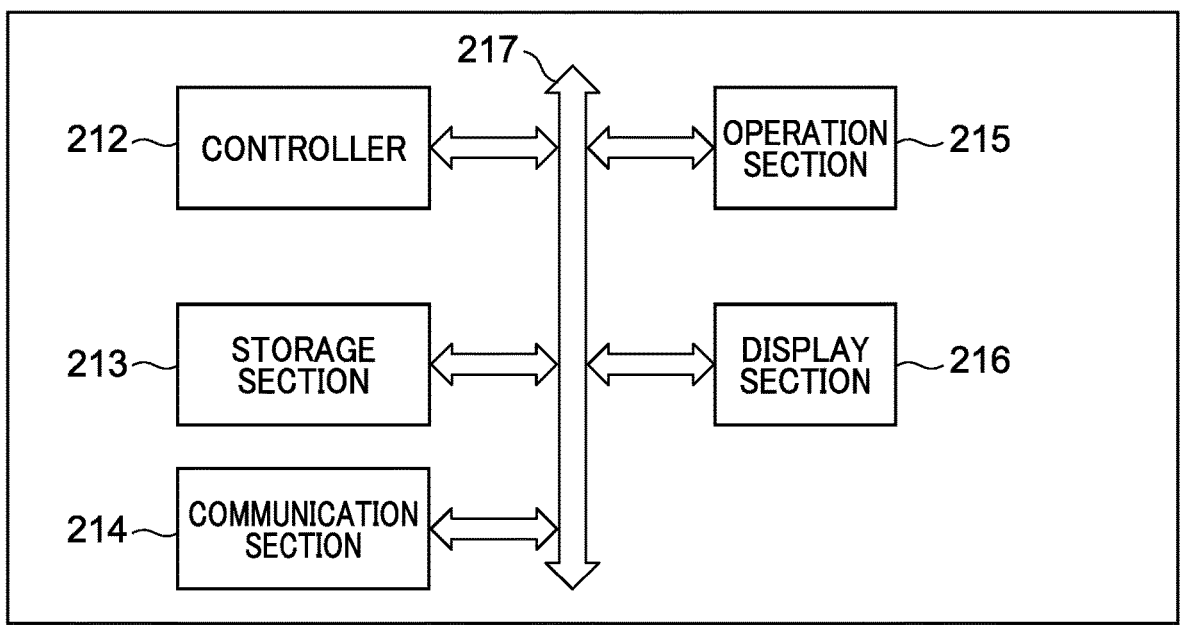

FIG. 2B is a schematic block diagram showing the configuration of the communication apparatus 105b appearing in FIG. 1. The communication apparatus 105b is, for example, a PC. Note that the communication apparatus 105b is not limited to the PC but can be an apparatus equipped with a communication function, such as a smartphone and a tablet terminal.

Referring to FIG. 2B, the communication apparatus 105b includes a controller 212, a storage section 213, a communication section 214, an operation section 215, and a display section 216. The controller 212, the storage section 213, the communication section 214, the operation section 215, and the display section 216 are interconnected via a bus 217.

The controller 212 performs centralized control of the whole communication apparatus 105b by executing programs stored in the storage section 213. The storage section 213 stores the programs executed by the controller 212, and the like. The communication section 214 is connected to the Internet and transmits and receives data to and from an external apparatus. The operation section 215 is comprised of, for example, a mouse and a keyboard and receives a variety of instructions from a user. The display section 216 displays a variety of information items.

FIG. 3 is a flowchart of a data transmission process performed by the image capturing apparatus 102 appearing in FIG. 1. The data transmission process in FIG. 3 is realized by the MPU 201 of the image capturing apparatus 102, which executes an associated program stored, for example, in the recording medium 209. The data transmission process in FIG. 3 is started when the image capturing apparatus 102 receives a photographing start operation performed by a photographer, such as an operation of pressing a photographing button of the image capturing apparatus 102.

Referring to FIG. 3, the MPU 201 drives a shutter (not shown) disposed on an object side of the image sensor 203 to control exposure time (step S301).

Then, the MPU 201 performs image capture processing for converting light from an object, received by the image sensor 203 via the shutter, to electrical signals (analog image data) (step S302).

Then, the MPU 201 performs image processing, such as development and encoding, on the electrical signals obtained by the above-mentioned image capture processing (step S303). As a result, image data is generated.

Then, the MPU 201 generates metadata including attribute information (a photographer, a photographing time, a photographing place, a model of the image capturing apparatus, settings of the image capturing apparatus at the photographing time, and so forth) of image data when the image capture processing for generating the image data has been performed (step S304). Note that in the step S304, the original metadata including the attribute information at the moment of photographing is also generated. Since the above-mentioned metadata has been generated at the photographing time, the contents of the metadata and the contents of the original metadata are the same.

Then, the MPU 201 generates an image file in the JPEG format, the MPEG format, or the like, which is formed by adding the metadata, the original thumbnail, and the original metadata to the image data (step S305). The original thumbnail is thumbnail data generated by reducing the image data as described hereinabove.

Then, the MPU 201 controls the hash value generation section 210 to generate hash values by applying a hash function to binary data items of the generated image file (step S306). Specifically, the hash function is applied to the image data, the metadata, the original thumbnail, and the original metadata included in the image file to generate respective hash values of the data items. The generated hash values of the respective date items are included in the image file. Further, signature values are generated by encoding the respective hash values of the data items with a secret key, and the generated signature values are also included in the image file.

Further, there is a case where when generating (calculating) a hash value, the hash value is generated by skipping part of the binary data of the image file. In this case, the MPU 201 generates hash value calculation detailed information which records how the part of the binary data of the image file has been skipped (how the data has been thinned) (step S307).

Then, the MPU 201 controls the communication section 211 to transmit the image file to the management system 101 (step S308). At this time, in a case where the hash value calculation detailed information has been generated in the step S307, the hash value calculation detailed information is also transmitted to the management system 101 together. Note that the data transmitted in the step S308 can be encoded. Further, the MPU 201 displays a warning screen on the image display section 207 (step S309). For example, this warning screen is displayed on the image display section 207 until the above-mentioned registration completion notification is received from the management system 101. This warning notification is a notification, for example, for attracting attention so as to inhibit a user from inserting or removing the recording medium 209 until registration in the blockchain is completed. This makes it possible to prevent a failure of the processing for registering the information on the image file in the blockchain or processing for adding registration completion information to the image file, described hereinafter.

Then, the MPU 201 stores the image file in the recording medium 209 (step S310), followed by terminating the present process.

Thus, in the present embodiment, when the image capturing apparatus 102 performs the photographing operation, not only the image file including the image data, the metadata, the original thumbnail, the original metadata, the signature values, and the hash values is recorded in the recording medium 209, but also the image file is transmitted to the management system 101. Further, in a case where the hash value calculation detailed information has been generated in the step S307, the hash value calculation detailed information is also transmitted to the management system 101.

Figure 4:
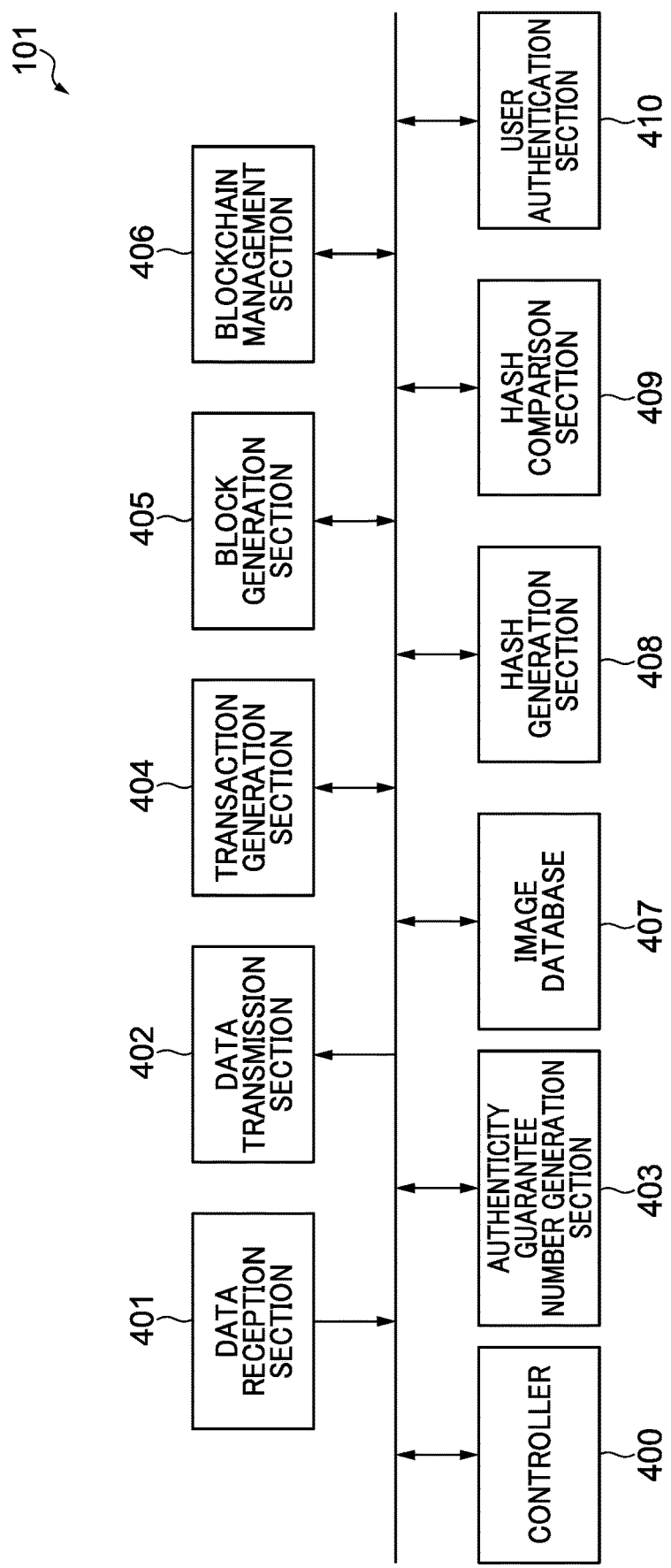
FIG. 4 is a schematic block diagram showing the configuration of the management system appearing in FIG. 1.

FIG. 4 is a schematic block diagram of the management system 101 appearing in FIG. 1. In the present embodiment, the management system 101 is formed by one or a plurality of computers connected to the network.

Referring to FIG. 4, the management system 101 includes a controller 400, a data reception section 401, a data transmission section 402, an authenticity guarantee number generation section 403, and a transaction generation section 404. Further, the management system 101 includes a block generation section 405, a blockchain management section 406, the image database 407, a hash generation section 408, a hash comparison section 409, and a user authentication section 410.

The controller 400 controls the overall operation of the management system 101.

The data reception section 401 receives a variety of data from an external apparatus. For example, the data reception section 401 receives hash value calculation detailed information and an image file from the image capturing apparatus 102. Further, the data reception section 401 receives an image file and an authenticity guarantee number for performing authenticity determination from the communication apparatus 105b operated by the viewing user of the image sharing site 103.

The data transmission section 402 transmits a variety of data to an external apparatus. For example, the data transmission section 402 transmits an image file selected to be disclosed on the image sharing site 103 and an authenticity guarantee number associated with the selected image file to the communication apparatus 105a operated by a user (such as a photographer or an image provider). Further, the data transmission section 402 transmits a result of the authenticity determination, authentic image information, described hereinafter, and difference information, described hereinafter, to the communication apparatus 105b operated by the viewing user who has requested confirmation of the authenticity of the image file.

The authenticity guarantee number generation section 403 generates, upon receipt of an image file from the image capturing apparatus 102, an authenticity guarantee number which is a unique number in the management system 101. Note that this authenticity guarantee number can be included in the image file.

The transaction generation section 404 generates transaction data and broadcasts the generated transaction data to one or more computers (nodes) participating in the peer-to-peer network 104 of the blockchain. The transaction data is generated when the image file and the hash value calculation detailed information are received from the image capturing apparatus 102. The transaction data includes the hash value calculation detailed information, the information on this image file, and an authenticity guarantee number associated with this image file. The information on this image file is formed by the original metadata, the original thumbnail, the hash values, and the image link which is the reference address of the server storing this image file, included in this image file.

When the broadcasted transaction data is approved by miners and the verification is completed, the block generation section 405 generates a block into which the transaction data has been written and connects the generated block to the blockchain.

The blockchain management section 406 manages the blockchain which is held by one or more computers (nodes) participating in the peer-to-peer network 104 of the blockchain. Further, the management system 101 and the nodes are synchronized with each other such that the blockchain held by each of them always has the same contents.

In the image database 407, an image file and an authenticity guarantee number associated with the image file are registered. Specifically, the image database 407 is formed by block IDs 501, authenticity guarantee numbers 502, image file names 503, and image notification settings 504, which are associated with one another, as shown in FIG. 5.

As each block ID 501, a block ID (ID number) sequentially issued is set whenever a block in which an image file has been written is connected to the blockchain. That is, the block ID 501 is associated with a set of hash values registered in the blockchain.

As the authenticity guarantee number 502, an authenticity guarantee number associated with an image file is set.

As the image file name 503, a file name of an image file received by the management system 101, for example, from the image capturing apparatus 102 is set. Note that as the image file name 503, in place of a file name of an image file, a reference address of a server storing the image file can be set.

As the image notification setting 504, a setting value of the image notification setting instructed from the communication apparatus 105a operated by the user (such as a photographer or an image provider) is set. Note that the configuration of the image database 407 is not limited to the above-described one, but the image database 407 may include other items.

Referring again to FIG. 4, the hash generation section 408 applies, when performing the authenticity determination, a hash function to the image data and the metadata, respectively, included in the image file transmitted from the communication apparatus 105b of the user (viewing user) having made the authenticity confirmation request to thereby generate hash values.

The hash comparison section 409 acquires a block (described hereinafter) associated with the authenticity guarantee number transmitted from the user having made the authenticity confirmation request, from the blockchain managed by the blockchain management section 406. Then, the hash comparison section 409 acquires hash values written in the acquired block of the blockchain. The hash comparison section 409 performs the authenticity determination by comparing the hash values acquired from the block and the hash values generated by the hash generation section 408. If these hash values are the same, the hash comparison section 409 determines that the image file transmitted from the user having made the authenticity confirmation request has not been altered from the state at the time of generation thereof (is authentic). On the other hand, if the hash values are different, the hash comparison section 409 determines that the image file transmitted from the user having made the authenticity confirmation request has been altered from the state at the time of generation thereof (is not authentic/is inauthentic). Note that in the authenticity determination, the hash value of the image data and the hash value of the metadata are generated by the hash generation section 408. The generated hash value of the image data and the hash value of the image data, acquired from the block, are compared, and further, the generated hash value of the metadata and the hash value of the metadata, acquired from the block, are compared.

For example, there is a case where an image file distributed from the image sharing site 103 to the communication apparatus 105b has been altered, and the altered image file is transmitted to the management system 101 together with an authenticity confirmation request. In a case where this authenticity confirmation request is received, hash values generated by the hash generation section 408 by applying the hash function to the received image file are different from hash values generated from the image file before alteration. Further, in the management system 101, the hash values stored in the blockchain cannot be changed by anyone. Therefore, in a case where the above-mentioned authenticity confirmation request is received, the hash values generated by the hash generation section 408 from the image file does not match hash values stored in a block of the blockchain, which is associated with the authenticity guarantee number included in the authenticity confirmation request.

The user authentication section 410 provides permission of authenticity confirmation based on authentication information transmitted from the communication apparatus 105b of the user (viewing user). The authentication information can be, not only an e-mail address, an organization to which the user belongs, or a password, but also, for example, a secret number provided to each organization, such as a company or a school. Further, after user authentication is successfully performed, a list of images on which the user is permitted to perform authenticity confirmation can be associated with the authentication information.

Figure 6:
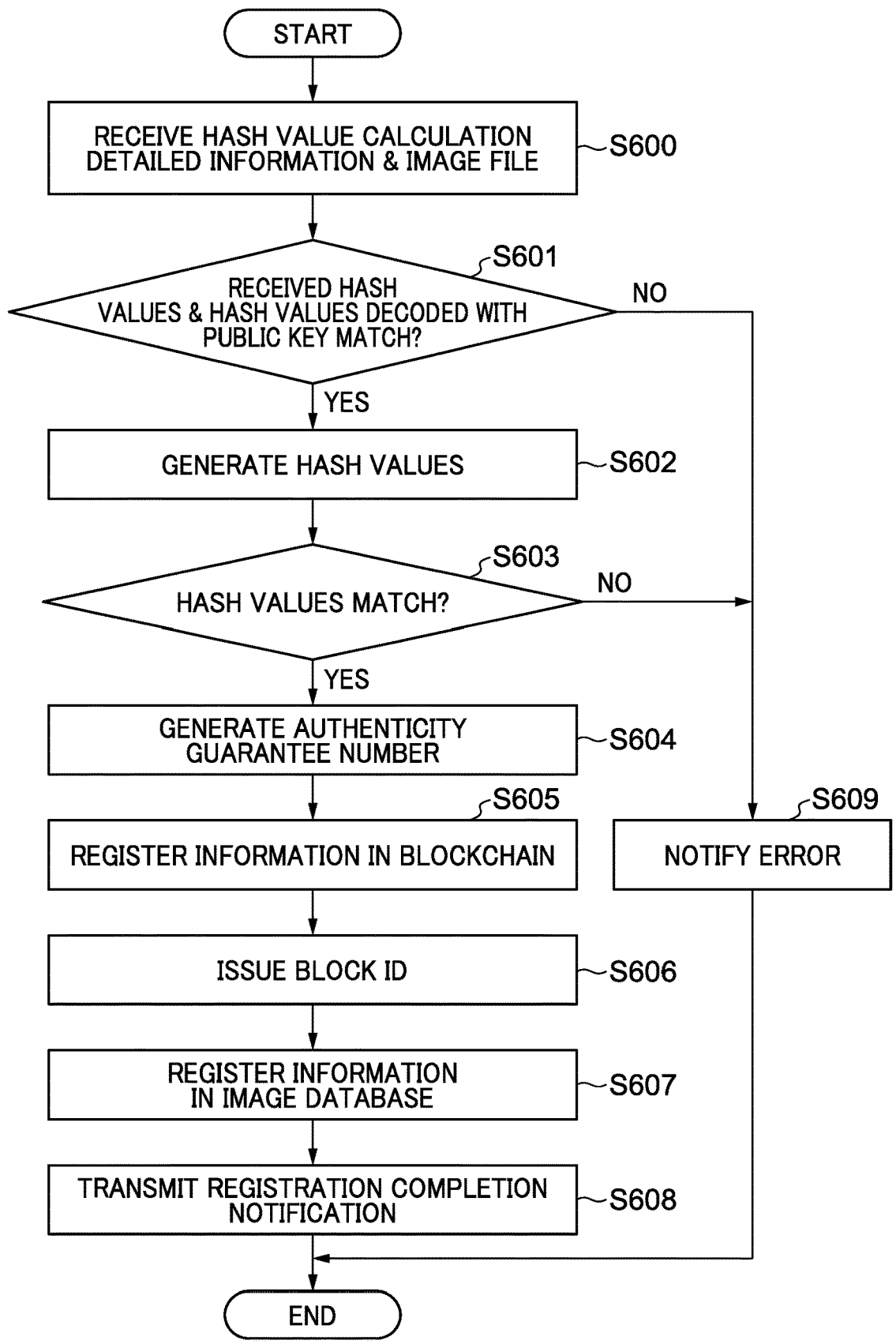
FIG. 6 is a flowchart of a blockchain registration process performed by the management system appearing in FIG. 1.

FIG. 6 is a flowchart of a blockchain registration process performed by the management system 101 appearing in FIG. 1. The blockchain registration process in FIG. 6 is realized by the controller 400 executing an associated program stored in a recording medium included in the computer as a component of the management system 101. The blockchain registration process in FIG. 6 is executed, for example, when the data transmission process in FIG. 3 is performed by the image capturing apparatus 102, and the image file is transmitted from the image capturing apparatus 102 by executing the step S308. Here, the description is given of a case where the hash value calculation detailed information is generated in the step S307, and the hash value calculation detailed information is also transmitted to the management system 101 together with the image file in the step S308.

Referring to FIG. 6, the controller 400 receives the hash value calculation detailed information and the image file from the image capturing apparatus 102 (step S600). In a case where the received data has been encoded, the controller 400 decodes the received data. After that, the controller 400 stores the hash value calculation detailed information, and the information on the image file, such as the metadata, the hash values, the original thumbnail, the original metadata, included in the received image file, in the RAM, not shown.

Then, the controller 400 decodes the signature values included in the received image file by using a public key. As a result, the hash value of the image data, the hash value of the metadata, the hash value of the original thumbnail, and the hash value of the original metadata are obtained. The controller 400 compares the hash values obtained by decoding the signature values and the hash values stored in the RAM. Specifically, the controller 400 compares between the hash values of the image data, between the hash values of the metadata, between the hash values of the original thumbnail, and between the hash values of the original metadata. Then, the controller 400 determines whether or not the hash values included in the image file match the hash values decoded by using the public key (step S601). If it is determined in the step S601 that any of results of the comparison indicates a mismatch, it is determined that the hash values included in the received image file do not match the hash values decoded by using the public key. In this case, the blockchain registration process proceeds to a step S609. On the other hand, if the results of the comparison all indicate matches, it is determined that the hash values included in the received image file match the hash values decoded by using the public key. In this case, the blockchain registration process proceeds to a step S602.

In the step S602, the controller 400 calculates hash values by applying the hash function to the image data and the metadata, included in the image file received in the step S600. Then, the controller 400 determines whether or not the hash values received in the step S600 and the hash values calculated in the step S602 match (step S603). Specifically, the hash value of the image data, stored in the RAM, not shown, in the step S600 and the hash value of the image data, calculated in the step S602 are compared. Further, the hash value of the metadata, stored in the RAM, not shown, in the step S600 and the hash value of the metadata, calculated in the step S602 are compared. If it is determined in the step S603 that results of the comparison all indicate matches, the process proceeds to a step S604, described hereinafter. If it is determined in the step S603 that any of the results of the comparison indicates a mismatch, the process proceeds to the step S609. In the step S609, the controller 400 sends an error notification that the image file cannot be registered in the blockchain. After that, the present process is terminated.

In the step S604, the controller 400 controls the authenticity guarantee number generation section 403 to generate an authenticity guarantee number of the received image file.

Then, the controller 400 registers the authenticity guarantee number generated in the step S602 and the information on the image file in the blockchain (step S605). Specifically, first, the transaction generation section 404 generates transaction data including the authenticity guarantee number and the information on the image file. The information on the image file includes the hash values, the hash value calculation detailed information, the original thumbnail, and the original metadata, stored in the RAM in the step S600, and the image link which is the reference address of the server storing the image file received in the step S600. Next, the transaction generation section 404 broadcasts the transaction data to one or more computers (nodes) participating in the peer-to-peer network 104 of the blockchain.

When the broadcasted transaction data is approved by miners and the verification is completed, the block generation section 405 generates a block in which the verified transaction data has been written and connects (registers) the generated block to (in) the blockchain.

Then, the controller 400 issues a block ID associated with the registered block (step S606). In this step, the controller 400 issues a value generated by applying the hash function twice to the header of the block as the block ID. Note that although the block ID is used when referring to the block, no field for the block ID is provided in the block.

Then, the controller 400 registers the issued block ID, the image file received in the step S600, and the authenticity guarantee number generated in the step S604, in the image database 407 in a state associated with each other (step S607). Note that at this time, the setting value of the image notification setting, set by the user in advance, is also registered in the image database 407. Then, the controller 400 transmits a registration completion notification that the processing for registering the information on the image file in the blockchain is completed to the image capturing apparatus 102 (step S608), followed by terminating the blockchain registration process.

Figure 7:
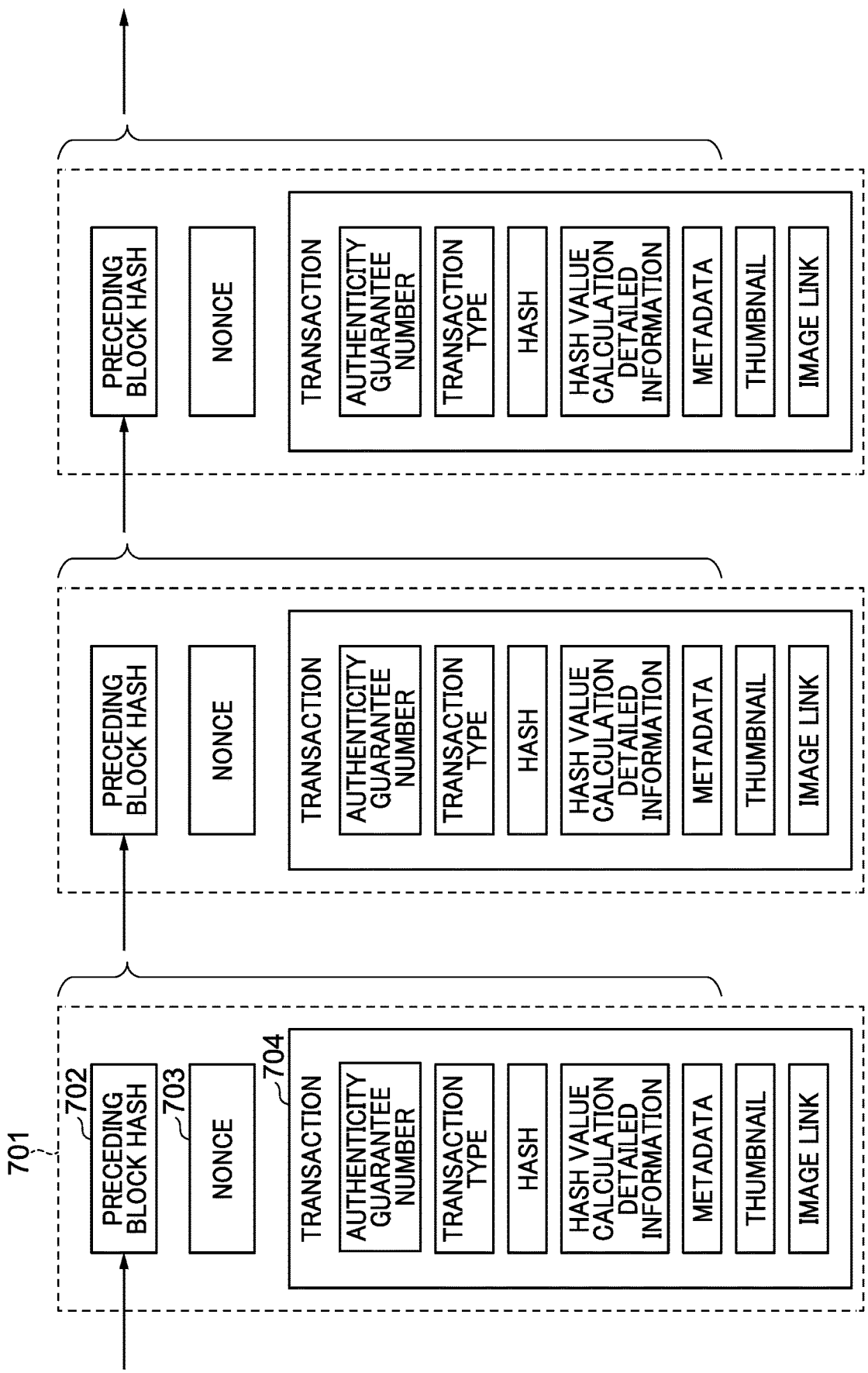
FIG. 7 is a diagram showing an example of a block data structure of a blockchain managed by a blockchain management section appearing in FIG. 4.

FIG. 7 is a diagram showing an example of the block data structure of the blockchain managed by the blockchain management section 406 appearing in FIG. 4. As shown in FIG. 7, the blockchain is a database formed by connecting blocks like a chain along the time series. A block 701 connected to the blockchain includes a preceding block hash 702, a nonce 703, and transaction 704.

The preceding block hash 702 is a hash value of a block connected to the blockchain immediately before the block 701.

The nonce 703 is a nonce value used for mining.

The transaction 704 is the transaction data generated by the transaction generation section 404, and includes a transaction type, hashes, an authenticity guarantee number, hash value calculation detailed information, metadata, a thumbnail, and an image link.

The transaction type is information indicating a type of transaction. The internal structure of the transaction is different depending on a transaction type.

The hashes are the hash value of image data, the hash value of metadata, the hash value of original metadata, and the hash value of an original thumbnail, included in the image file transmitted from the image capturing apparatus 102 to the management system 101.

The authenticity guarantee number is the authenticity guarantee number generated by the management system 101 in a state associated with the image file received from the image capturing apparatus 102.

The hash value calculation detailed information is the hash value calculation detailed information transmitted from the image capturing apparatus 102 to the management system 101.

The metadata is the original metadata included in the image file transmitted from the image capturing apparatus 102 to the management system 101. The thumbnail is the original thumbnail included in the image file transmitted from the image capturing apparatus 102 to the management system 101.

The image link is a reference address of a server storing the image file transmitted from the image capturing apparatus 102 to the management system 101. Note that in a case where a data amount of the image data is small to some extent, the image data itself can be included in the transaction data.

Figure 8:
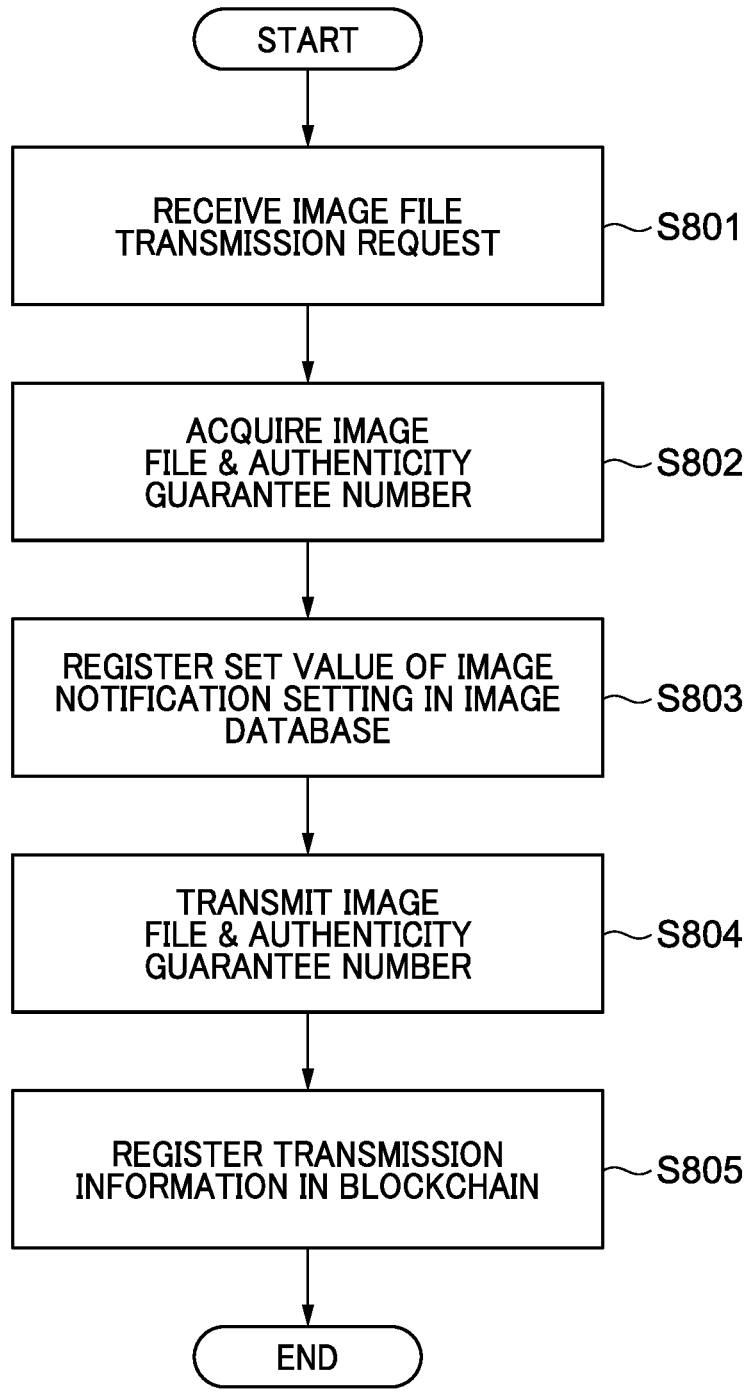
FIG. 8 is a flowchart of an image data-transmitting process performed by the management system appearing in FIG. 1, for transmitting image data to an image sharing site.

FIG. 8 is a flowchart of an image file transmission process performed by the management system 101 appearing in FIG. 1, for transmitting the image file to the image sharing site 103. The image file transmission process in FIG. 8 is also realized by the controller 400 executing an associated program stored in the recording medium included in the computer as the component of the management system 101. The image file transmission process in FIG. 8 is executed when the user (such as a photographer) selects one of a plurality of image files registered in the image database 407 and makes a request for transmitting the selected image file to the image sharing site 103 using the communication apparatus 105a. This transmission request includes a block ID associated with the image file selected by the user in the image database 407. Further, this transmission request also includes a setting value of the image notification setting set by the user.

Referring to FIG. 8, first, the controller 400 receives the above-mentioned transmission request from the communication apparatus 105a operated by the user, via the data reception section 401 (step S801).

Then, the controller 400 acquires an image file as the target of the transmission request and the authenticity guarantee number of this image file from the image database 407 (step S802). Specifically, the controller 400 acquires the image file and the authenticity guarantee number, associated with a block ID included in the transmission request, from the image database 407.

Then, the controller 400 acquires the setting value of the image notification setting from the transmission request. The controller 400 registers the setting value of the image notification setting in the image database 407, in a state associated with the image file and the authenticity guarantee number, which are acquired in the step S802 (step S803).

Then, the controller 400 controls the data transmission section 402 to transmit the acquired image file and authenticity guarantee number to the image sharing site 103 (step S804). At the same time, the controller 400 notifies the communication apparatus 105a of the user as the requesting source of the transmission request that the image file as the target of the transmission request has become capable of being disclosed on the image sharing site 103.

Then, the controller 400 registers the transmission information of the image file in the blockchain (step S805). Specifically, first, the transaction generation section 404 generates transaction data including the authenticity guarantee number, and information indicating the transmission destination (URL or the like) of the image file and the authenticity guarantee number. Next, the transaction generation section 404 broadcasts the transaction data to one or more computers (nodes) participating in the peer-to-peer network 104 of the blockchain. When the broadcasted transaction data is approved by miners and the verification is completed, the block generation section 405 generates a block in which the verified transaction data has been written and connects the generated block to the blockchain. After that, the image file transmission process is terminated.

As described above, in the image file transmission process in FIG. 8, when an image file is transmitted from the management system 101 to the image sharing site 103 in response to a transmission request from a user, the management system 101 notifies the user that the image file has become capable of being disclosed on the image sharing site 103. The transmission information of the image file is registered in the blockchain at the same time. This enables the user to grasp a use status of the image file.

Figure 9:
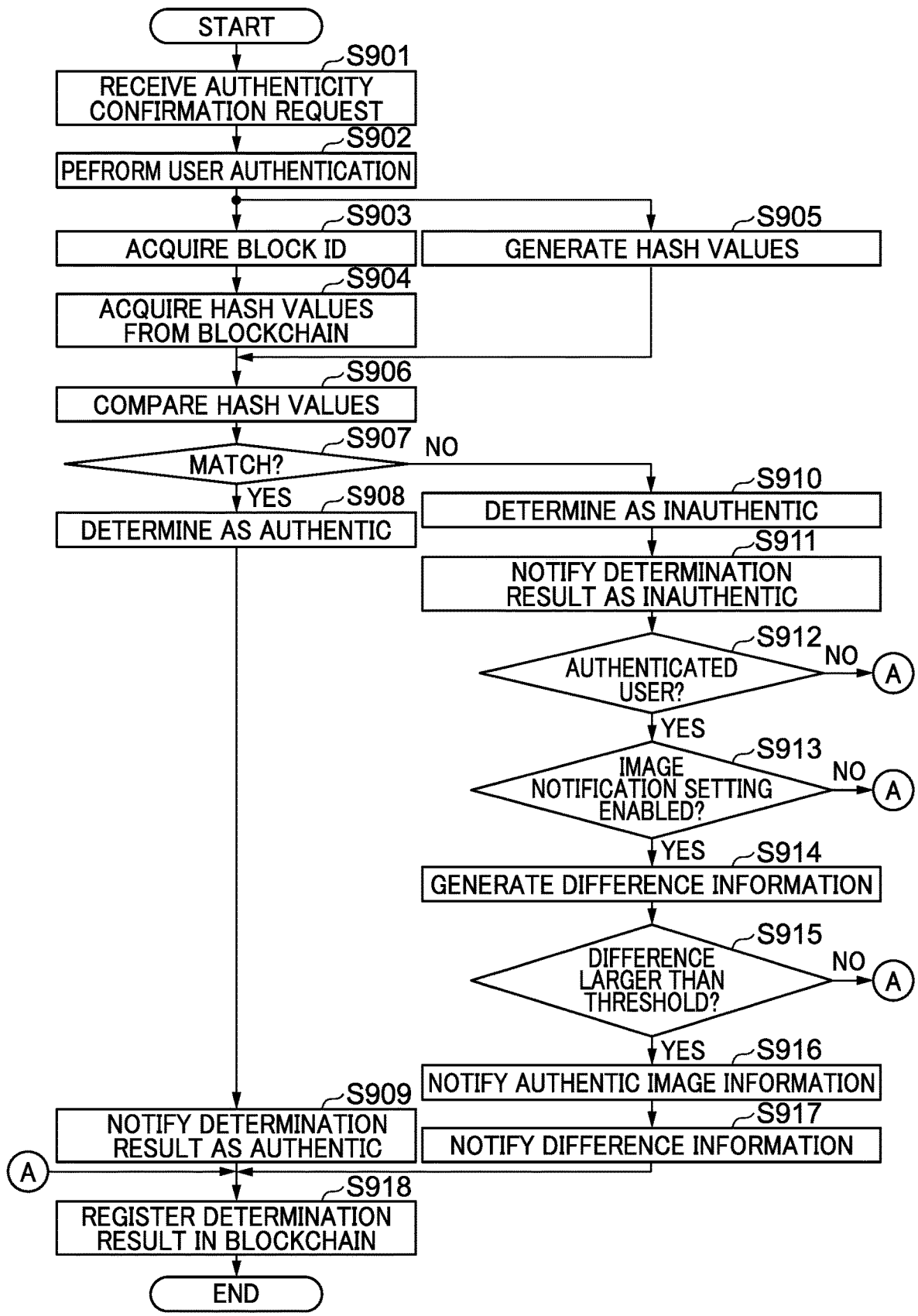
FIG. 9 is a flowchart of an authenticity determination process performed by the management system appearing in FIG. 1.

FIG. 9 is a flowchart of an authenticity determination process performed by the management system 101 appearing in FIG. 1. The authenticity determination process in FIG. 9 is also realized by the controller 400 executing an associated program stored in the recording medium included in the computer as the component of the management system 101. Note that although in this example, the authenticity determination process in FIG. 9 is executed when a viewing user of the image sharing site 103 makes a request for confirming the authenticity of an image file displayed on the image sharing site 103 to the management system 101 by operating the communication apparatus 105b, this is not limitative.

Referring to FIG. 9, the controller 400 receives an authenticity confirmation request from the communication apparatus 105b operated by the viewing user, via the data reception section 401 (step S901). When receiving this request, the controller 400 also receives an image file as the target of the authenticity determination, an authenticity guarantee number associated with this image file, and authentication information necessary for user authentication, via the data reception section 401. Note that this authenticity guarantee number is an authentication guarantee number for identifying an authentic image file used as a reference for determining the authenticity of the image file as the target of the authenticity determination from a plurality of image files registered in the image database 407. Further, the authentication information is, as mentioned above, for example, an e-mail address, an organization to which the user belongs, a password, or a secret number provided to each organization, such as a company and a school.

Then, the controller 400 performs user authentication for determining whether or not the viewing user is a user who is permitted to confirm the authenticity of the image, based on the authentication information received in the step S901 (step S902). Note that the image file and the authenticity guarantee number associated with the image file can be received after the user authentication is successfully performed.

Then, the controller 400 inquires the image database 407 by using the authenticity guarantee number received in the step S901 as a key and thereby acquires a block ID associated with this authenticity guarantee number (step S903).

Then, the controller 400 accesses a block corresponding to the acquired block ID in the blockchain and acquires hash values stored in this block (step S904).

Further, in parallel with the steps S903 and S904, the controller 400 controls the hash generation section 408 to apply the hash function to the image data and the metadata, included in the image file received in the step S901 (step S905). With this, the hash value of the image data and the hash value of the metadata are generated. In doing this, the controller 400 accesses a block corresponding to the acquired block ID of the plurality of blocks forming the blockchain and acquires the hash value calculation detailed information stored in this block. In the step S905, by referring to this hash value calculation detailed information, the hash values are generated.

When the steps S903 to S905 are completed, the controller 400 controls the hash comparison section 409 to compare the hash values acquired in the step S904 and the hash values generated in the step S905 (step S906). Specifically, the hash value of the image data, acquired in the step S904, and the hash value of the image data, generated in the step S905 are compared. Further, the hash value of the metadata, acquired in the step S904, and the hash value of the metadata, generated in the step S905 are compared. Note that although in the present embodiment, the description is given of the configuration in which both of the comparison of the hash values of the image data and the comparison of the hash values of the metadata are performed, only the comparison of the hash values of the image data can be performed. Further, the hash value of the original thumbnail and the hash value of the original metadata can also be generated in the step S905, and comparison of the hash values of the original thumbnail and comparison of the hash values of the original metadata can also be performed.

The controller 400 determines whether or not results of the comparison in the step S906 all indicate matches (step S907).

If it is determined in the step S907 that the results of the comparison in the step S906 all indicate matches, the controller 400 determines the image file as "authentic" indicating that the image file received in the step S901 has not been altered from the state at the time of generation thereof (step S908). After that, the authenticity determination process proceeds to a step S909.

In the step S909, the controller 400 controls the data transmission section 402 to notify "authenticity" as the result of the determination to the communication apparatus 105b which is the requesting source of the authenticity confirmation request. In the step S909, the determination result is displayed on the WEB page of the management system 101 or notified to the communication apparatus 105b by e-mail. Note that in the step S909, for example, only the notification that the determination result indicates "authenticity" is transmitted. After that, the authenticity determination process proceeds to a step S918.

On the other hand, if it is determined in the step S907 that any of results of the comparison in the step S906 indicates a mismatch, the authenticity determination process proceeds to a step S910. In the step S910, the controller 400 determines the image file as "inauthentic" indicating that the image file received in the step S901 has been altered from the state at the time of generation thereof. After that, the authenticity determination process proceeds to a step S911.

In the step S911, the controller 400 controls the data transmission section 402 to notify "inauthenticity" as the determination result to the communication apparatus 105b which is the requesting source of the authenticity confirmation request. Then, the controller 400 determines whether or not the user is the user authenticated by the user authentication section 410 (step S912). For example, in a case where the user authentication in the step S902 has failed, it is determined in the step S912 that the user is not the user authenticated by the user authentication section 410. In this case, the result of the authenticity determination is not notified, and the authenticity determination process proceeds to the step S918, described hereinafter. On the other hand, in a case where the user authentication in the step S902 has been successfully performed, it is determined in the step S912 that the user is the user authenticated by the user authentication section 410. In this case, the authenticity determination process proceeds to a step S913.

In the step S913, the controller 400 determines whether or not the image notification setting which has been inquired to the image database 407 using the authenticity guarantee number received in the step S901 as the key and is associated with this authenticity guarantee number, is set to enabled (step S913). If it is determined in the step S913 that the image notification setting is not set to enabled, the result of the authenticity determination is not notified, and the authenticity determination process proceeds to the step S918, described hereinafter. If it is determined in the step S913 that the image notification setting is set to enabled, the authenticity determination process proceeds to a step S914.

In the step S914, the controller 400 acquires an image file associated with the block ID acquired in the step S903 from the image database 407 and generates difference information between this image file and the image file as the target of the authenticity determination. Specifically, the difference information of the data determined as a mismatch as a result of the comparison in the step S906 is generated.

Then, the controller 400 determines whether or not a difference between the data determined as a mismatch as the result of the comparison in the step S906 is larger than a threshold value set in advance (step S915). Note that this threshold value is a value set by a user or a fixed value determined in advance. If it is determined in the step S915 that the difference is not larger than the threshold value, the authenticity determination process proceeds to the step S918, described hereinafter. If it is determined in the step S915 that the difference is larger than the threshold value, the authenticity determination process proceeds to a step S916.

In the step S916, the controller 400 notifies authentic image information to the viewing user as the requesting source of the authenticity confirmation request (step S916). The authentic image information is, for example, the image data included in the image file registered in the image database 407, which is associated with the block ID acquired in the step S903. For example, in a case where the reference address of a server storing the image file has been registered in the image database 407, the controller 400 acquires the image file from the server indicated by this reference address. Further, the controller 400 notifies the viewing user of the image data included in the acquired image file as the authentic image information. Note that the authentic image information is not limited to the image data but can be the thumbnail or metadata included in this image file. As the notification provided in the step S916, the authentic image information is displayed on the WEB page of the management system 101 or transmitted to the communication apparatus 105b by e-mail.

Then, the controller 400 notifies the viewing user as the requesting source of the authenticity confirmation request of the difference information generated in the step S914 (step S917). As the notification provided in the step S917, the difference information is displayed on the WEB page of the management system 101 or transmitted to the communication apparatus 105b by e-mail.

Then, the controller 400 controls the block generation section 405 to register the determination result obtained in the step S908 or S910 in the blockchain (step S918). Specifically, the block generation section 405 generates a block in which the determination result obtained in the step S908 or S910 has been written and connects the generated block to the blockchain. Then, the present process is terminated.

FIGS. 10A to 10D are diagrams each showing an example of a result of determination by the authenticity determination process, which is displayed on the WEB page of the management system 101 appearing in FIG. 1.

FIG. 10A shows an example of the notification in a case where the determination result indicates "authenticity". This notification includes only a message indicating that the image as the determination target has not been altered, but does not include, for example, an image associated with the authentic image information or the difference information.

FIG. 10B shows an example of the notification in a case where the determination result indicates "inauthenticity" and only the image data out of the image data and the metadata has been altered. This notification includes not only a message indicating that the image data has been altered but also a transmitted image, an authentic image, and a difference image. The transmitted image is an image corresponding to the image file received by the management system 101 together with the authenticity confirmation request. The authentic image is an image corresponding to the authentic image information notified in the step S916 and is the authentic image file of the received image file, i.e. an image corresponding to the image file before alteration. The difference image is an image corresponding to the difference information notified in the step S917 and is an image indicating a difference between the transmitted image and the authentic image.

FIG. 10C shows an example of the notification in a case where the determination result indicates "inauthenticity", and only the metadata out of the image data and the metadata has been altered. This notification includes not only a message indicating that the metadata has been altered but also transmitted metadata, authentic metadata, and difference metadata. The transmitted metadata is the metadata included in the image file received by the management system 101 together with the authenticity confirmation request. The authentic metadata is metadata corresponding to the authentic image information notified in the step S916, and is metadata included in the authentic image file of the received image file, i.e. metadata included in the image file before alteration. The difference metadata is information of the metadata corresponding to the difference information notified in the step S917, and is information indicating the difference between the transmitted metadata and the authentic metadata.

FIG. 10D shows an example of the notification in a case where the determination result indicates "inauthenticity", and both of the image data and the metadata have been altered. This notification includes not only a message indicating that the image data and the metadata have been altered but also the above-mentioned transmitted image, transmitted metadata, authentic image, authentic metadata, difference image, and difference metadata.

As described above, according to the present embodiment, the following process is executed in the management system 101: First, upon receipt of an authenticity confirmation request from a viewing user, hash values generated based on the image file received together with the authenticity confirmation request and the hash values registered in the blockchain, which are associated with the authenticity guarantee number received together with the authenticity confirmation request, are compared. If it is determined that a result of the authenticity determination indicates inauthenticity, the authentic image information associated with the authenticity guarantee number is notified. With this, the viewing user can know the actual data before alteration in a case where a result of the authenticity determination indicates inauthenticity.

Further, in the present embodiment, the authentic image information is image data included in the image file acquired from the server indicated by the reference address registered in the image database 407. With this, in a configuration in which image files are stored in a server other than the management system 101, it is possible to notify the viewing user of actual data before alteration in a case where a result of the authenticity determination indicates inauthenticity.

In the present embodiment, since the authentic image information is displayed on the WEB page of the management system 101, in a case where a result of the authenticity determination indicates inauthenticity, the viewing user can know the actual data before alteration from the WEB page of the management system 101.

In the present embodiment, since the authentic image information is transmitted to the requesting source of the authenticity confirmation request by e-mail, in a case where a result of the authenticity determination indicates inauthenticity, the viewing user can know the actual data before alteration from the authentic image information received by e-mail.

In the present embodiment, the difference information between the image file as the target of the authenticity determination and the image file acquired from the image database 407 and associated with the authenticity guarantee number is notified. With this, the viewing user can know not only the actual data before alteration, but also how the data has been altered.

In the present embodiment, in a case where it is determined that a result of the authenticity determination indicates inauthenticity, and a difference of the data determined as a mismatch as a result of the comparison in the step S906 is larger than the threshold value, the authentic image information is notified. With this, the viewing user can grasp a difference before and after alteration to some extent by comparing the authentic image information and the image file as the target of the authenticity determination.

In the present embodiment, in a case where it is determined that a result of the authenticity determination indicates authenticity, a message that the result of the authenticity determination indicates authenticity is notified without notifying the authentic image information. With this, it is possible to reduce the communication load by suppressing the amount of data transmission of the authentic image information including image data relatively large in data amount to the necessary minimum.

In the present embodiment, whether or not to notify the authentic image information is controlled based on a setting value of the image notification setting set by a user (such as a photographer or an image provider). With this, it is possible to reflect the photographer's or image provider's intention with respect to the notification of the authentic image information.

In the present embodiment, in a case where it is determined that a result of the authenticity determination indicates inauthenticity, and user authentication is successfully performed in the step S902, the authentic image information is notified. With this, in a case where a result of the authenticity determination indicates inauthenticity, it is possible to notify how was the actual data before alteration to a viewing user who performed registration of the image file in advance.

Here, a plurality of image files generated by the photographing processing performed by the image capturing apparatus 102 are stored in the recording medium 209 of the image capturing apparatus 102. These image files include an image file whose information has been registered in the blockchain by performing the above-described process. The user (photographer) confirms the image files on the image display section 207 of the image capturing apparatus 102 and performs favorite registration and image file deletion so as to organizes the image files stored in the recording medium 209. However, conventionally, which image file has its information registered in the blockchain is not displayed on the image display section 207 of the image capturing apparatus 102, and hence it is difficult for the user to organize the image files.

On the other hand, in the present embodiment, upon receipt of a registration completion notification indicating that the process for registering information on an image file in the blockchain is completed, registration completion information indicating that the information on the image file has been registered in the blockchain is added to the image file.

Figure 11:
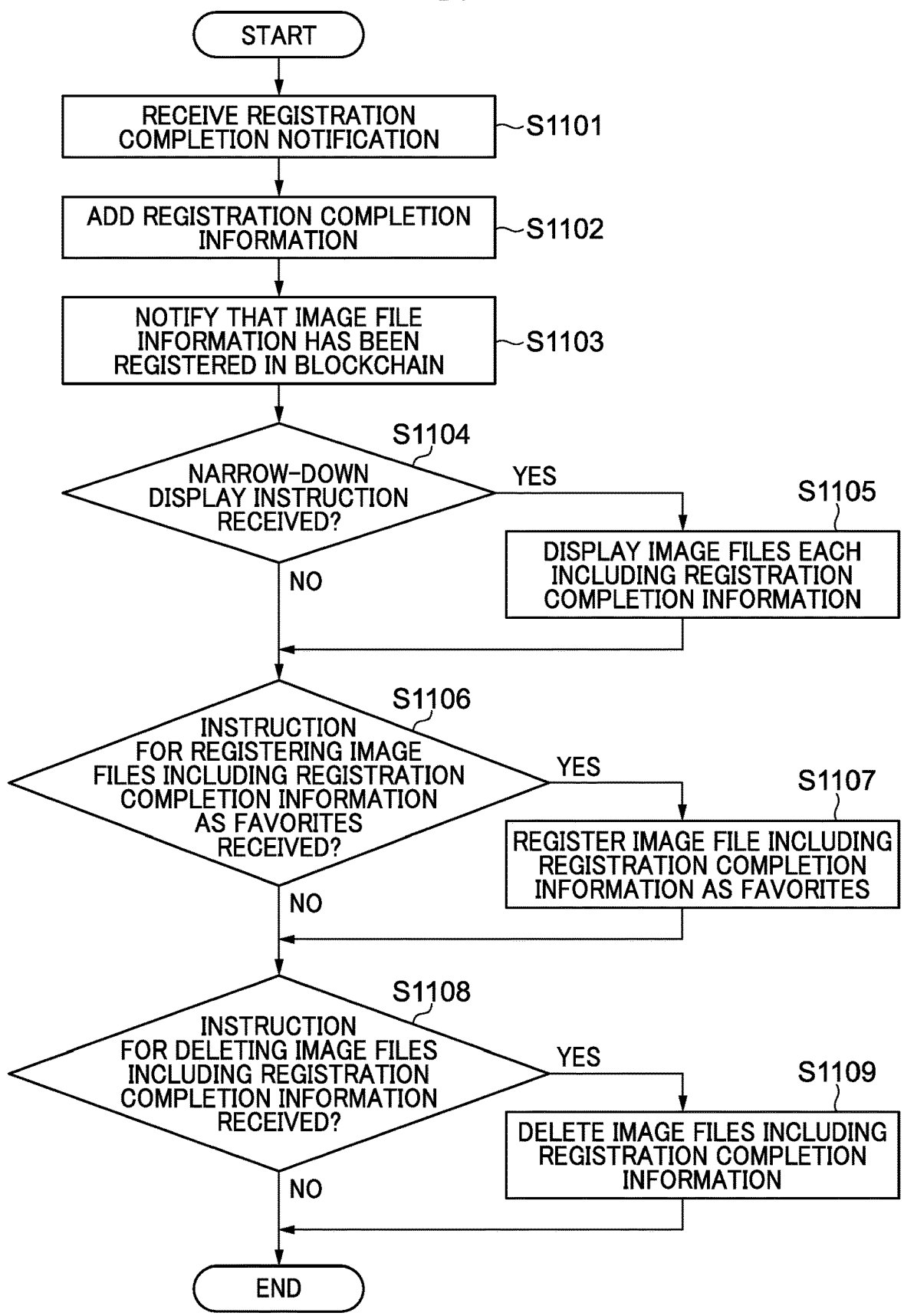
FIG. 11 is a flowchart of a registration completion information-adding process performed by the image capturing apparatus appearing in FIG. 1.

FIG. 11 is a flowchart of a registration completion information-adding process performed by the image capturing apparatus 102 appearing in FIG. 1. The registration completion information-adding process in FIG. 11 is realized by the MPU 201 of the image capturing apparatus 102 executing an associated program stored, for example, in the recording medium 209. The registration completion information-adding process in FIG. 11 is executed when the management system 101 completes the process for registering information on an image file in the blockchain.

Referring to FIG. 11, first, the MPU 201 receives the above-mentioned registration completion notification from the management system 101 (step S1101). Then, the MPU 201 adds registration completion information to the image file (step S1102). Specifically, the MPU 201 adds the registration completion information to the metadata included in the image file. The registration completion information is information indicating that the information on the image file has been registered in the blockchain. Then, the MPU 201 notifies the user that the information on the image file has been registered in the blockchain (step S1103). Specifically, the MPU 201 displays a guide for notifying the user that the information on the image file has been registered in the blockchain on the image display section 207. Then, the MPU 201 determines whether or not a narrow-down display instruction has been received (step S1104).

If it is determined in the step S1104 that a narrow-down display instruction has been received, the MPU 201 displays image files each including metadata to which the registration completion information has been added, out of the plurality of image files stored in the recording medium 209, on the image display section 207 (step S1105). Note that an image file including metadata to which the registration completion information has been added is hereinafter referred to as a registration completion information-including image file. After that, the process proceeds to a step S1106.

If it is determined in the step S1104 that the narrow-down display instruction has not been received, the MPU 201 determines whether or not an instruction for registering registration completion information-including image files as favorites has been received (step S1106).

If it is determined in the step S1106 that the instruction for registering registration completion information-including image files as favorites has been received, the MPU 201 registers registration completion information-including image files out of the plurality of image files stored in the recording medium 209 as favorites (step S1107). Thereafter, the process proceeds to a step S1108.

If it is determined in the step S1106 that the instruction for registering registration completion information-including image files as favorites has not been received, the MPU 201 determines whether or not an instruction for deleting registration completion information-including image files has been received (step S1108).

If it is determined in the step S1108 that the instruction for deleting registration completion information-including image files has not been received, the present process is terminated. If it is determined in the step S1108 that the instruction for deleting registration completion information-including image files has been received, the MPU 201 deletes registration completion information-including image files from the recording medium 209 (step S1109), followed by terminating the present process.

According to the present embodiment, immediately after an image file is generated, hash values of this image file are generated, and the information on the image file including these hash values is transmitted to the management system 101. Upon receipt of a registration completion notification indicating that the information on the image file has been registered in the blockchain, the registration completion information is added to the image file. With this, it is possible to easily confirm the image file whose information has been registered in the blockchain.

Further, in the present embodiment, the image file includes image data obtained by photographing an object. With this, it is possible to easily confirm the image data whose information has been registered in the blockchain.

Further, in the present embodiment, the image data is still image data or moving image data. With this, it is possible to easily confirm the still image data or moving image data whose information has been registered in the blockchain.

In the present embodiment, the registration completion information-including image files out of the plurality of image files stored in the recording medium 209 are displayed on the image display section 207 according to the narrow-down display instruction provided by a user. With this, the user can easily grasp the image files whose information has been registered in the blockchain.

Further, in the present embodiment, registration completion information-including image files of the plurality of image files stored in the recording medium 209 are registered as favorites according to an instruction provided by a user for registering the registration completion information-including image files as favorites. With this, the user can easily register the image files whose information has been registered in the blockchain as favorites.

Further, in the present embodiment, registration completion information-including image files are deleted from the recording medium 209 according to an instruction provided by a user for deleting the registration completion information-including image files. With this, it is possible to easily delete the image files whose information has been registered in the blockchain from the recording medium 209.

Note that in the step S1102, for example, in a case where the recording medium 209 has been removed from the image capturing apparatus 102, making it impossible to add the registration completion information to the image file, a cause of the failure in adding the registration completion information can be notified to the user. With this, the user can easily grasp the cause of the failure in adding the registration completion information and immediately take a measure to successfully add the registration completion information.

Although in the present embodiment, the description has been given of the configuration in which the image capturing apparatus 102 adds the registration completion information to the image file, this is not limitative. For example, the management system 101 can add the registration completion information to the image file acquired from the image capturing apparatus 102 and transmit the image file to which the registration completion information has been added to the image capturing apparatus 102. In this configuration as well, it is possible to obtain the same advantageous effects as provided by the above-described embodiment.

Further, in the present embodiment, the moving image data can be data having only voice data. With this, it is possible to easily confirm the voice data whose information has been registered in the blockchain.

Further, in the present embodiment, the registration completion information-including image files can be displayed on the image display section 207 in a state discriminable from image files to which the registration completion information has not been added. For example, in the vicinity of each registration completion information-including image file, a predetermined mark or the like indicating that the information on this image file has been registered in the blockchain is displayed. On the other hand, in the vicinity of the image file to which the registration completion information has not been added, the above-mentioned predetermined mark or the like is not displayed. By performing such display control, the user can easily grasp the image files whose information has been registered in the blockchain.

Next, a second embodiment of the present invention will be described. The second embodiment is basically the same in the configuration and the effects as the above-described first embodiment but differs from the first embodiment in that the communication apparatus 105b performs the authenticity determination. Therefore, redundant description of the configuration and the effects is omitted, and the following description will be given of different points in the configuration and the effects.

In the configuration in which the communication apparatus 105b performs the authenticity determination, in the step (6) in FIG. 1, details of the processing performed after the communication apparatus 105b has downloaded the image file and the authenticity guarantee number from the image sharing site 103 are different, and hence the details of the processing will be described.

Figure 12:
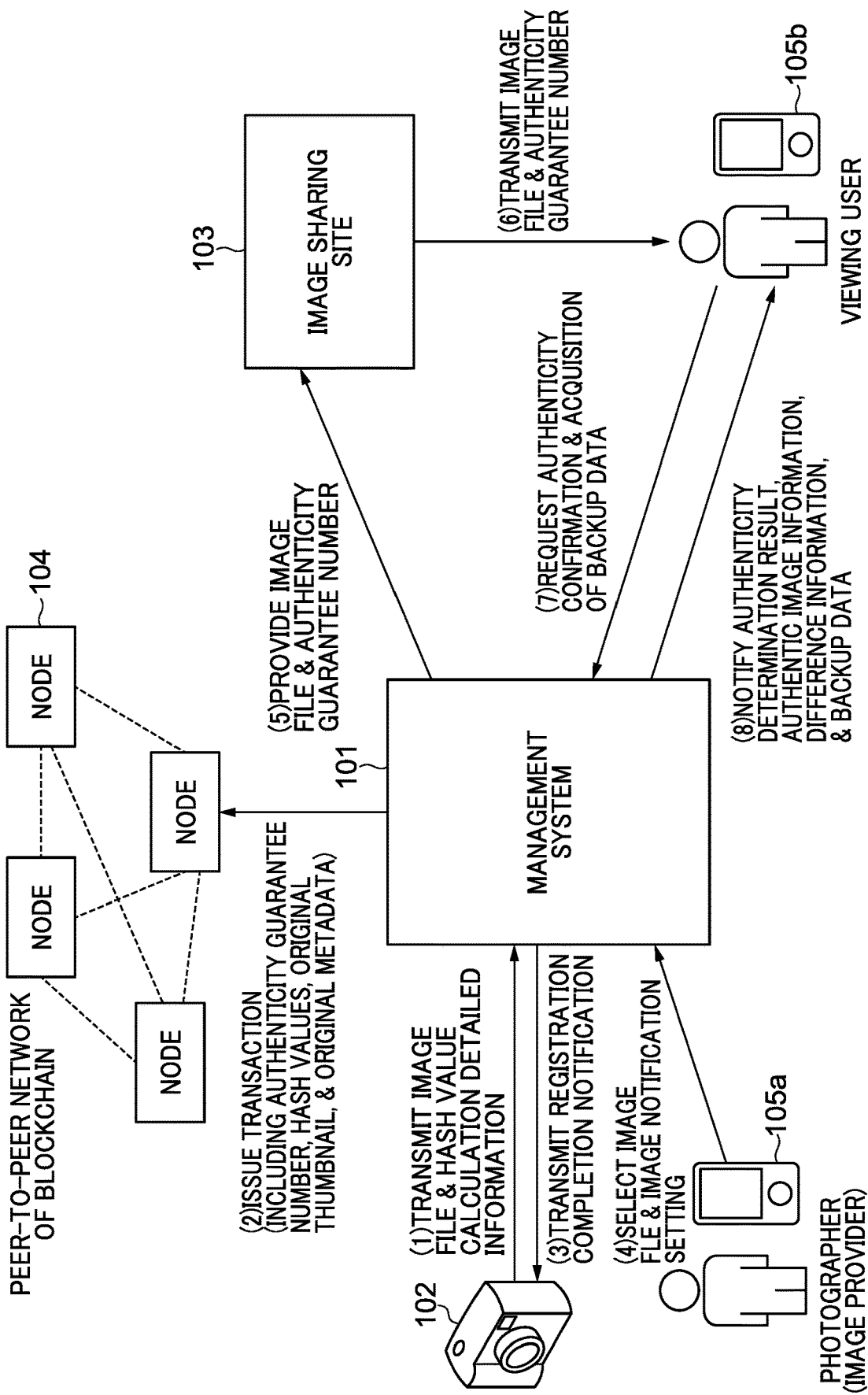
FIG. 12 is a diagram useful in explaining the functions of the management system according to a second embodiment of the present invention.

FIG. 12 is a diagram useful in explaining the functions of the management system 101 according to the second embodiment.

When the download is completed, the communication apparatus 105b verifies whether or not the hash values included in the image file have not been altered by using the hash values obtained by decoding the signature values included in the acquired image file. Further, the communication apparatus 105b applies the hash function to the image data, the metadata, the original thumbnail, and the original metadata, included in this image file, to generate hash values of these data items. The communication apparatus 105b verifies whether or not the image data, the metadata, the original thumbnail, and the original metadata have not been altered by comparing the generated hash values and the hash values included in the image file. By this verification, if it is determined that the original thumbnail has not been altered but the image data has been altered, the communication apparatus 105b displays the difference information on the display section 216 based on the original thumbnail and the image data. Further, if it is determined that the original metadata has not been altered but the metadata has been altered, the communication apparatus 105b displays the difference information on the display section 216 based on the original metadata and the metadata.

Further, if it is determined that the original thumbnail or the original metadata has been altered, the communication apparatus 105b transmits an authenticity confirmation request of the image file to the management system 101 together with the image file and the authenticity guarantee number.

Then, the communication apparatus 105b transmits a backup data acquisition request for restoring an altered portion to the management system 101 (step (7)). The authenticity guarantee number is also transmitted together with the backup data acquisition request. In the present embodiment, the backup data acquisition request is performed by attaching the authenticity guarantee number to an entry form provided by the management system 101. However, the backup data acquisition request is not limited to the above-mentioned method, but for example, the backup data acquisition request can be performed by transmitting an e-mail to which the image file and the authenticity guarantee number are attached to the management system 101.

When the authenticity confirmation request is transmitted from the communication apparatus 105b, the management system 101 performs the authenticity determination on the image file as the target of the authenticity confirmation request. The management system 101 displays a result of the authenticity determination, the authentic image information, and the difference information on the WEB page of the management system 101 or notifies the communication apparatus 105b of the above-mentioned information items by e-mail. Further, the management system 101 transmits data of the altered portion to the communication apparatus 105b in response to the backup data acquisition request received from the communication apparatus 105b (step (8)).

Figure 13:
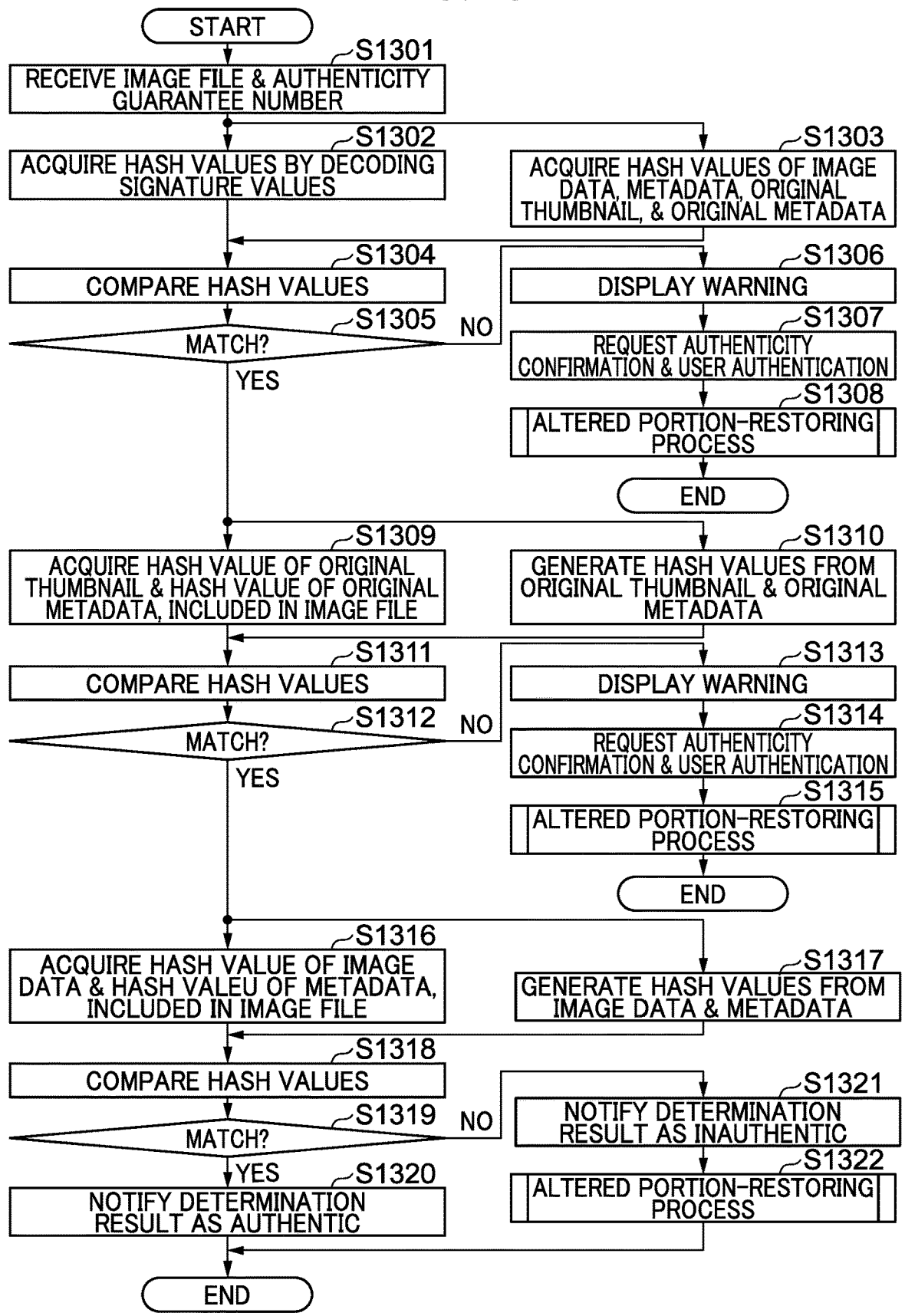
FIG. 13 is a flowchart of an authenticity confirmation process performed by the communication apparatus appearing in FIG. 1.

FIG. 13 is a flowchart of an authenticity confirmation process performed by the communication apparatus 105b appearing in FIG. 1. The authenticity confirmation process in FIG. 13 is realized by the controller 212 of the communication apparatus 105b, which executes an associated program stored in the storage medium 213. The authenticity confirmation process in FIG. 13 is executed when the image sharing site 103 transmits an image file and an authenticity guarantee number in response to a download instruction received from the communication apparatus 105b.

Referring to FIG. 13, first, the controller 212 receives the image file and the authenticity guarantee number from the image sharing site 103 (step S1301). Note that the authenticity guarantee number can be included in the image file. Then, the controller 212 decodes the signature values included in the received image file by using a public key to acquire the hash values (step S1302). As a result, the hash value of the image data, the hash value of the metadata, the hash value of the original thumbnail, and the hash value of the original metadata are obtained.

Further, the controller 212 acquires hash values included in the received image file in parallel with the processing in the step S1302 (step S1303). The hash values acquired in the step S1303 are the hash value of the image data, the hash value of the metadata, the hash value of the original thumbnail, and the hash value of the original metadata.

Further, the controller 212 compares the hash values obtained by decoding the signature values and the hash values included in the image file (step S1304). Specifically, the hash value of the image data, obtained by decoding the signature value, and the hash value of the image data, included in the received image file, are compared. The hash value of the metadata, obtained by decoding the signature value, and the hash value of the metadata, included in the received image file, are compared. The hash value of the original thumbnail, obtained by decoding the signature value, and the hash value of the original thumbnail, included in the received image file, are compared. The hash value of the original metadata, obtained by decoding the signature value, and the hash value of the original metadata, included in the received image file, are compared.

Then, the controller 212 determines whether or not results of the comparison in the step S1304 all indicate matches (step S1305). If it is determined in the step S1305 that any of the results of the comparison in the step S1304 indicates a mismatch, the authenticity confirmation process proceeds to a step S1306.

In the step S1306, the controller 212 displays a warning. Specifically, the controller 212 displays a warning notification indicating that a hash value included in the image file received in the step S1301 has been altered and is in an illegal format, on the display section 216.

Then, the controller 212 transmits an authenticity confirmation request of the image file received in the step S1301 and a user authentication request to the management system 101 (step S1307). Then, the controller 212 executes an altered portion-restoring process, described hereinafter with reference to FIG. 14 (step S1308), followed by terminating the present process.

If it is determined in the step S1305 that results of the comparison in the step S1304 all indicate matches, it is determined that the hash values included in the received image file have not been altered. In this case, processing for determining presence/absence of alteration in the image data, the metadata, the original thumbnail, and the original metadata, included in the received image file, by using the hash values included in the received image file is performed. Specifically, the authenticity confirmation process proceeds to a step S1309. In the step S1309, the controller 212 acquires the hash value of the original thumbnail and the hash value of the original metadata, included in the received image file (step S1309).

Further, the controller 212 applies a hash function to the original thumbnail and the original metadata, included in the received image file, to generate hash values of these data items in parallel with the processing in the step S1309 (step S1310). Then, the controller 212 compares the hash values acquired in the step S1309 and the hash values generated in the step S1310 (step S1311). Specifically, the hash value of the original thumbnail, acquired in the step S1309, and the hash value of the original thumbnail, generated in the step S1310, are compared. Further, the hash value of the original metadata, acquired in the step S1309, and the hash value of the original metadata, generated in the step S1310, are compared.

Then, the controller 212 determines whether or not results of the comparison in the step S1311 all indicate matches (step S1312). If it is determined in the step S1312 that any of the results of the comparison in the step S1311 indicates a mismatch, the authenticity confirmation process proceeds to a step S1313.

In the step S1313, the controller 212 displays a warning. Specifically, the controller 212 displays a warning notification indicating that the original thumbnail or the original metadata included in the image file received in the step S1301 has been altered and is in an illegal format, on the display section 216. Then, the controller 212 transmits an authenticity confirmation request of the image file received in the step S1301 and a user authentication request to the management system 101 (step S1314). This authenticity confirmation request includes a request for executing comparison with respect to the data of the original thumbnail or the original metadata, determined as a mismatch as a result of the comparison in the step S1311. The controller 400 of the management system 101 executes the above-described authenticity determination process in FIG. 9 and transmits the authentic image information and the difference information to the communication apparatus 105b, for example, by e-mail in response to this authenticity confirmation request. This difference information includes the difference information between the data (data before alteration) included in the image file registered in the image database 407 and the data (data after alteration) included in the image file transmitted to the management system 101 together with the authenticity confirmation request, with respect to the data determined as a mismatch as a result of the comparison in the step S1311. Then, the controller 212 executes the altered portion-restoring process, described hereinafter with reference to FIG. 14 (step S1315), followed by terminating the present process.

If it is determined in the step S1312 that results of the comparison in the step S1311 all indicate matches, the authenticity confirmation process proceeds to a step S1316. In the step S1316, the controller 212 acquires the hash value of the image data and the hash value of the metadata, included in the received image file.

Further, the controller 212 applies the hash function to the image data and the metadata, included in the received image file, respectively, to generate hash values of these data items in parallel with the processing in the step S1316 (step S1317). Then, the controller 212 compares the hash values acquired in the step S1316 and the hash values generated in the step S1317 (step S1318). Specifically, the hash value of the image data, acquired in the step S1316, and the hash value of the image data, generated in the step S1317, are compared. The hash value of the metadata, acquired in the step S1316, and the hash value of the metadata, generated in the step S1317, are compared.

Then, the controller 212 determines whether or not results of the comparison in the step S1318 all indicate matches (step S1319). If it is determined in the step S1319 that results of the comparison in the step S1318 all indicate matches, the authenticity confirmation process proceeds to a step S1320.

In the step S1320, the controller 212 notifies the user that the result of the authenticity determination indicates "authenticity". For example, the controller 212 displays such a screen as shown in FIG. 10A, indicating that a result of the authenticity determination indicates "authenticity" and the image file has not been altered, on the display section 216, followed by terminating the present process.

If it is determined in the step S1319 that any of the results of the comparison in the step S1318 indicates a mismatch, the authenticity confirmation process proceeds to a step S1321. In the step S1321, the controller 212 notifies the user that the result of the authenticity determination indicates "inauthenticity".

For example, in a case where only the image data out of the image data and the metadata has been altered, such a screen as shown in FIG. 10B, is displayed on the display section 216. On this screen, the transmitted image is an image based on the image data included in the received image file, and the authentic image is an image based on the original thumbnail confirmed by the comparison in the step S1311 that the data has not been altered. Further, the difference image is an image indicating a difference between the transmitted image and the authentic image.

Further, in a case where only the metadata out of the image data and the metadata has been altered, such a screen as shown in FIG. 10C, is displayed on the display section 216. On this screen, the transmitted metadata corresponds to the metadata included in the received image file, and the authentic metadata corresponds to the original metadata confirmed by the comparison in the step S1311 that the data has not been altered. The difference metadata is a difference between the transmitted metadata and the authentic metadata. Further, in a case where both of the image data and the metadata have been altered, such a screen as shown in FIG. 10D, is displayed on the display section 216.

Then, the controller 212 executes the altered portion-restoring process, described hereinafter with reference to FIG. 14 (step S1322), followed by terminating the present process.

Figure 14:
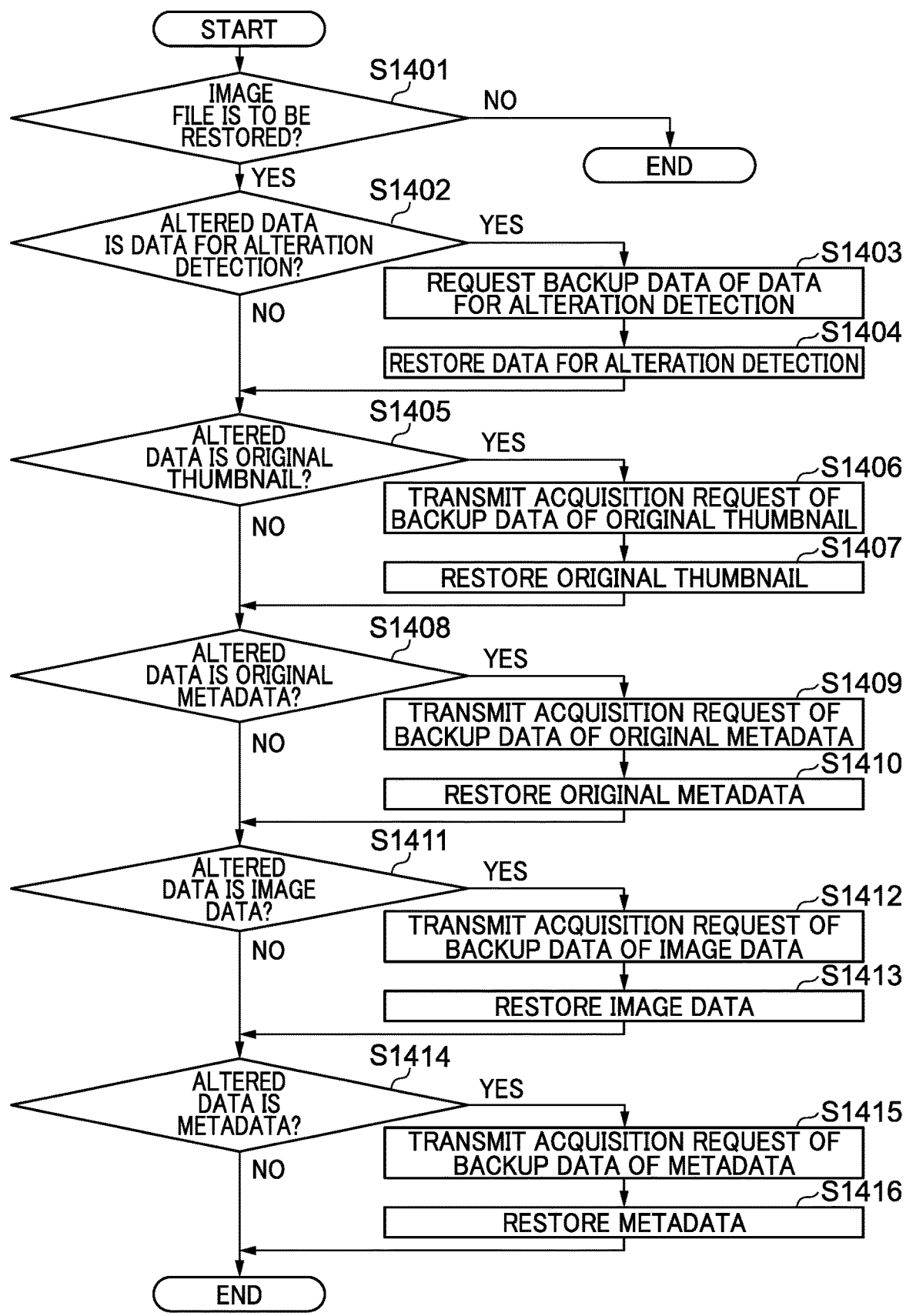
FIG. 14 is a flowchart of an altered portion-restoring process performed in steps in FIG. 13.

FIG. 14 is a flowchart of the altered portion-restoring process performed in the steps S1308, S1315, and S1322 in FIG. 13. The altered portion-restoring process in FIG. 14 is realized by the controller 212 of the communication apparatus 105b, which executes an associated program stored in the storage medium 213.

Referring to FIG. 14, first, the controller 212 determines whether or not to restore the altered portion of the image file (step S1401). In the step S1401, for example, in a case where an instruction has not been received from the user, a case where an altered portion restoration setting has been set to off in advance, or a case where the authentic image information has already been received in the authenticity confirmation process executed before this process, it is determined not to restore the altered portion of the image file. In this case, the present process is terminated. On the other hand, in a case where the instruction has been received from the user, or a case where the altered portion restoration setting has been set to on in advance, it is determined to restore the altered portion of the image file. In this case, the altered portion-restoring process proceeds to a step S1402.

In the step S1402, the controller 212 determines whether or not the altered data is data for alteration detection. The data for alteration detection includes the hash values and the signature values out of the data included in the image file. If it is determined that the altered data is the data for alteration detection, the altered portion-restoring process proceeds to a step S1403, whereas if it is determined that the altered data is not the data for alteration detection, the altered portion-restoring process proceeds to a step S1405.

In the step S1403, the controller 212 transmits a request for acquiring backup data of the data for alteration detection to the management system 101. Then, the controller 212 executes processing for restoring the data for alteration detection using the backup data of the data for alteration detection, which has been received from the management system 101 (step S1404). Note that in the restoration processing in the step S1404, overwriting of the altered portion at a binary level is assumed, but the altered portion can be restored by using another method.

Then, the controller 212 determines whether or not the altered data is the original thumbnail (step S1405). If it is determined that the altered data is the original thumbnail, the altered portion-restoring process proceeds to a step S1406, whereas if it is determined that the altered data is not the original thumbnail, the altered portion-restoring process proceeds to a step S1408.

In the step S1406, the controller 212 transmits a request for acquiring backup data of the original thumbnail to the management system 101. Then, the controller 212 executes processing for restoring the original thumbnail using the backup data of the original thumbnail, which has been received from the management system 101 (step S1407). Note that also in the restoration processing in the step S1407, overwriting of the altered portion at a binary level is assumed, but the altered portion can be restored by using another method.

Then, the controller 212 determines whether or not the altered data is the original metadata (step S1408). If it is determined that the altered data is the original metadata, the altered portion-restoring process proceeds to a step S1409, whereas if it is determined that the altered data is not the original metadata, the altered portion-restoring process proceeds to a step S1411.

In the step S1409, the controller 212 transmits a request for acquiring backup data of the original metadata to the management system 101. Then, the controller 212 executes processing for restoring the original metadata using the backup data of the original metadata, which has been received from the management system 101 (step S1410). Note that also in the restoration processing in the step S1410, overwriting of the altered portion at a binary level is assumed, but the altered portion can be restored by using another method.

Then, the controller 212 determines whether or not the altered data is the image data (step S1411). If it is determined that the altered data is the image data, the altered portion-restoring process proceeds to a step S1412, whereas if it is determined that the altered data is not the image data, the altered portion-restoring process proceeds to a step S1414.

In the step S1412, the controller 212 transmits a request for acquiring backup data of the image data to the management system 101. Then, the controller 212 executes processing for restoring the image data using the backup data of the image data, which has been received from the management system 101 (step S1413). Note that also in the restoration processing in the step S1413, overwriting of the altered portion at a binary level is assumed, but the altered portion can be restored by using another method.

Then, the controller 212 determines whether or not the altered data is the metadata (step S1414). If it is determined that the altered data is the metadata, the altered portion-restoring process proceeds to a step S1415, whereas if it is determined that the altered data is not the metadata, the altered portion-restoring process is terminated.

In the step S1415, the controller 212 transmits a request for acquiring backup data of the metadata to the management system 101. Then, the controller 212 executes processing for restoring the metadata using the backup data of the metadata, which has been received from the management system 101 (step S1416). Note that also in the restoration processing in the step S1416, overwriting of the altered portion at a binary level is assumed, but the altered portion can be restored by using another method. Further, in the present embodiment, the restoration processing is executed only on the altered data, and hence the processing load is reduced, compared with the restoration processing performed by downloading all data items included in the image file.

Note that in the present embodiment, in a case where a plurality of portions have been altered, inquiries to the management system 101 can be collectively performed.

Although in the present embodiment, the description has been given of the configuration in which the above-described authenticity confirmation process is executed by the communication apparatus 105b, the management system 101 can execute the above-described authenticity confirmation process based on an image file acquired from the communication apparatus 105b.

Figure 15:
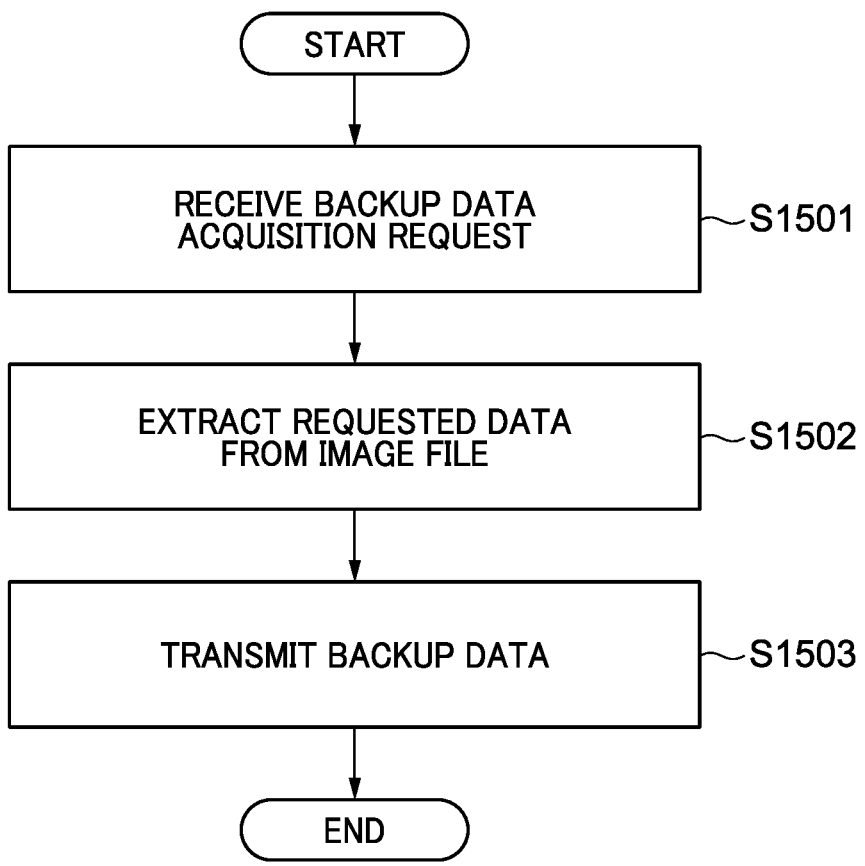
FIG. 15 is a flowchart of a backup data transmission process performed by the management system appearing in FIG. 1.

FIG. 15 is a flowchart of a backup data transmission process performed by the management system 101 appearing in FIG. 1. The backup data transmission process in FIG. 15 is realized by the controller 400 executing an associated program stored in a recording medium included in the computer as the component of the management system 101. The backup data transmission process in FIG. 15 is executed, for example, when the communication apparatus 105b transmits a backup data acquisition request to the management system 101.

Referring to FIG. 15, the controller 400 receives a backup data acquisition request from the communication apparatus 105b operated by the viewing user, via the data reception section 401 (step S1501). Note that although in the present embodiment, it is assumed that information indicating which data is to be backed up by using the requested backup data is attached to this backup data acquisition request, this is not limitative. For example, the management system 101 can identify a portion where alteration has been detected and transmit backup data for restoring this alteration-detected portion to the communication apparatus 105b. Further, although it is assumed that acquisition of the authentication information, the authenticity guarantee number associated with the image file, and the block ID associated with his authenticity guarantee number has already been executed in the above-described authenticity determination process in FIG. 9, this is not limitative. For example, when a backup data acquisition request is received, the controller 400 can receive the authenticity guarantee number associated with the image file and the authentication information via the data reception section 401 and acquire a block ID associated with this authenticity guarantee number anew. Further, in a case where the authentic image information has already been transmitted to the communication apparatus 105b in the authenticity confirmation process performed before receiving the backup data acquisition request, the controller 400 can reject the backup data acquisition request.

Then, the controller 400 acquires an image file associated with the block ID from the image database 407. The controller 400 extracts data designated by the backup data acquisition request from this image file (step S1502).

Then, the controller 400 controls the data transmission section 402 to transmit the data extracted in the step S1502 as the backup data to the communication apparatus 105b which is the requesting source of the backup data acquisition request (step S1503), followed by terminating the present process.

Note that although in the present embodiment, as data to be extracted in the step S1502, an associated one of data for alteration detection, an original thumbnail, original metadata, image data, and metadata is assumed, data other than these can be extracted.

As described above, according to the present embodiment, the following process is performed in the communication apparatus 105b: First, an image file formed by a plurality of data items and an authenticity guarantee number associated with this image file are received, and whether or not this image file has been altered is determined based on these data items. If it is determined that this image file has not been altered, a result of the authenticity determination is notified based on these data items. Further, if it is determined that this image file has been altered, a result of the authenticity determination is notified based on the authentic image information acquired from the management system 101. That is, in a case where an image file downloaded from the image sharing site 103 has been altered, the communication apparatus 105b acquires the authentic image information including information on the image file before alteration from the management system 101 and notifies the user of the result of the authenticity determination based on this authentic image information. With this, the viewing user can know the actual data before alteration in a case where a result of the authenticity determination indicates inauthenticity.

Further, in the present embodiment, the image data included in the authentic image information is managed by using the blockchain, and hence it is possible to positively provide the information before alteration to the viewing user.

In the present embodiment, hash values included in an image file as the target of the authenticity determination and hash values obtained by decoding signature values included in this image file using a public key are compared to determine whether or not any of the hash values included in this image file has been altered. With this, it is possible to easily determine presence/absence of alternation in the hash values included in this image file.

Further, in the present embodiment, hash values obtained by applying the hash function to the image data, the metadata, the original thumbnail, and the original metadata, included in the image file, and the hash value of the image data, the hash value of the metadata, the hash value of the original thumbnail, and the hash value of the original metadata, included in the image file, are compared, respectively, to determine whether or not any of the image data, the metadata, the original thumbnail, and the original metadata, included in the image file, has been altered. With this, it is possible to easily determine presence/absence of alteration in the image data, the metadata, the original thumbnail, and the original metadata, included in this image file.

Further, in the present embodiment, data determined as the altered data is restored based on backup data acquired from the management system 101. With this, in a case where a result of the authenticity determination indicates inauthenticity, it is possible to restore the data determined as the altered data in the image file to the data before alteration.

Next, a third embodiment of the present invention will be described. The third embodiment is basically the same in the configuration and the effects as the above-described first and second embodiments but differs from the first and second embodiments in that the authenticity of an image file to which a non-fungible token (hereinafter referred to as the "NFT") is added is determined. Therefore, redundant description of the configuration and the effects is omitted, and the following description will be given of different points in the configuration and effects.

Recently, a technique of adding a non-fungible asset value to digital contents easy to be copied, using an NFT issued on the blockchain, is drawing attention. By managing the NFT attached to the digital contents on the blockchain, it is possible to manage the ownership of the contents without suffering from forgery or alteration, performed by a third party. Therefore, it is possible to determine the authenticity of contents and uniquely identify the current owner or account of the contents.

By thus managing the NFT on the blockchain, the owner of contents is made impossible to alter. However, a person other than the creator of contents can exhibit NFT-attached digital content, for example, in a sales site, so that impersonation is widespread. To cope with this problem, if the creator of the contents is a famous person, the creator can make people widely aware that he/she is the creator of the digital contents by performing promotion using, for example, an SNS. On the other hand, a creator who does not use an SNS or a creator who is not well known cannot make people widely aware that he/she is the creator of the digital contents, and hence a third party who is not the creator becomes capable of impersonating the creator and thereby exhibiting the NFT-attached digital contents in a sales site. This causes a situation in the sales site, in which a plurality of NFT-attached digital contents exhibited from different exhibitors are sold, with respect to the same digital contents. In such a case, a purchaser cannot know which are the digital contents created by the true creator.

To solve this problem, in the third embodiment, NFT-related information (non-fungible token-related information), described hereinafter, is registered in a state associated with the authenticity guarantee number of this image file according to an instruction received from the creator of the image file associated with the hash values registered in the blockchain. In a case where it is determined that a result of the authenticity determination indicates authenticity, the NFT-related information associated with the authenticity guarantee number is notified.

Here, in the configuration for determining the authenticity of an NFT-attached image file, a process different from the above-described process shown in FIG. 1 is performed, and hence details of the process different from the process shown in FIG. 1 will be described.

Figure 16:
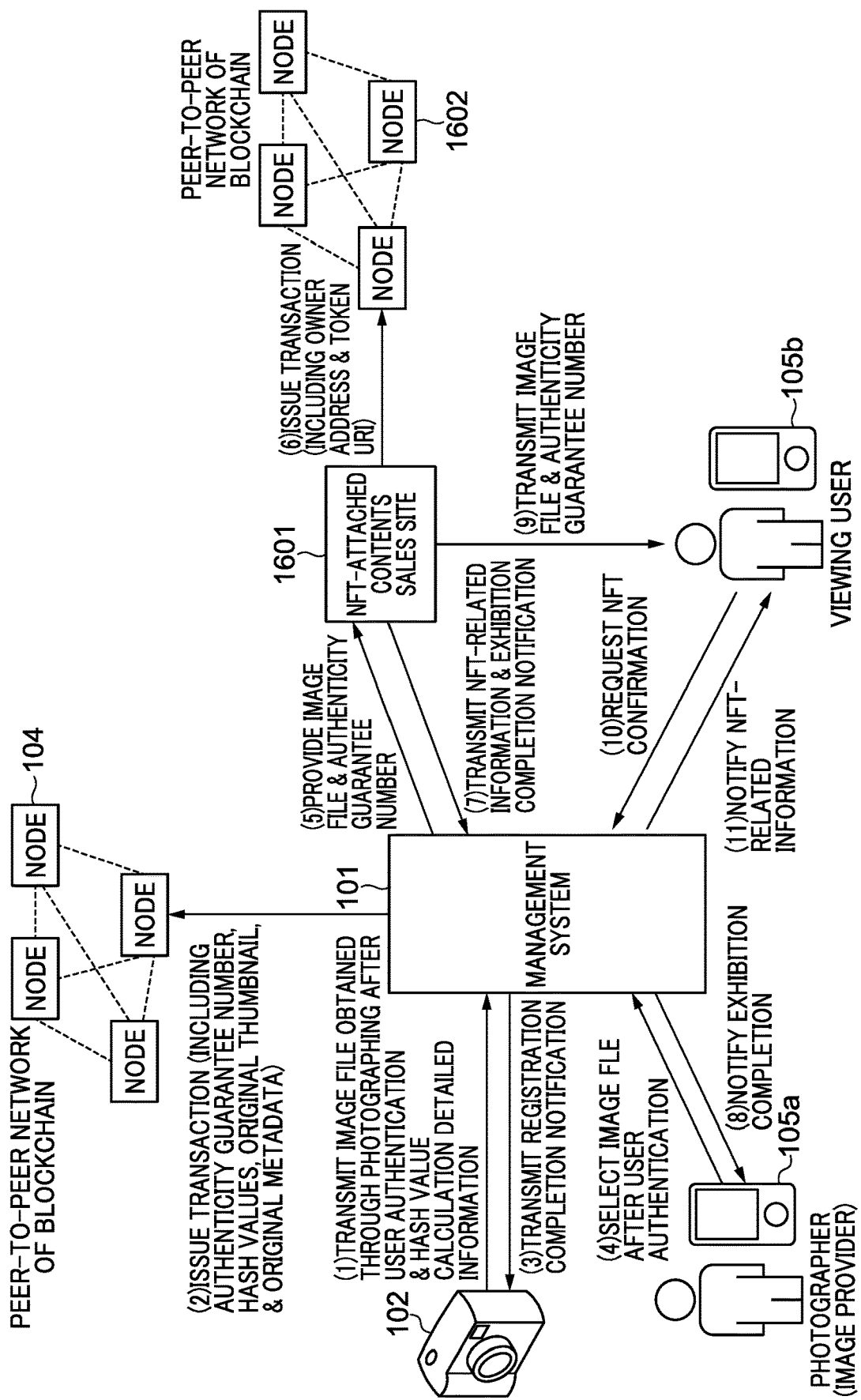
FIG. 16 is a diagram useful in explaining the functions of the management system according to a third embodiment of the present invention.

FIG. 16 is a diagram useful in explaining the functions of the management system 101 according to the third embodiment.

As shown in FIG. 16, first, the image capturing apparatus 102 performs user authentication using authentication information of the photographer. Examples of the authentication information include an e-mail address of the photographer, information indicating an organization to which the photographer belongs, a password, a secret number provided to each organization, such as a company and a school, and biological information. In the user authentication, the authentication information of the photographer is transmitted from the image capturing apparatus 102 to the management system 101, and the management system 101 performs the authentication processing by collating the received authentication information of the photographer with user information registered in advance. If these information items match, the use of an NFT management function for managing information on an NFT-attached image file is permitted, and a notification indicating that the user authentication has been successfully performed is transmitted to the image capturing apparatus 102. When the image capturing apparatus 102 performs the photographing operation after the user authentication has been successfully performed, similarly to the step (1) in FIG. 1, the image capturing apparatus 102 transmits an image file obtained through this photographing operation, hash values, and hash value calculation detailed information to the management system 101 in a state associated with each other (step (1)).

Note that although also in the present embodiment, the configuration in which the image capturing apparatus 102 generates hash values and transmits the generated hash values to the management system 101 will be described, this is not limitative, but for example, the management system 101 can generate hash values based on an image file acquired from the image capturing apparatus 102.

Similarly to the above-described step (2) in FIG. 1, the management system 101 generates transaction data including the information on the image file, such as metadata, the hash values, and the hash value calculation detailed information, and the authenticity guarantee number, and connects a block, in which the generated transaction data has been written, to the blockchain (step (2)). Specifically, the management system 101 issues the generated transaction data to broadcast the transaction data to one or more computers (nodes) participating in the peer-to-peer network 104 of the blockchain. With this, the transaction data is temporarily stored in a transaction pool, and when the transaction data is approved by miners, verification is completed. Then, a block in which the transaction data has been written is generated and is added to the end of the blockchain. With this, the information on the image file is registered in the blockchain.

After connecting the block in which the transaction data has been written to the blockchain, the management system 101 stores (provides) the image file and the authenticity guarantee number in a state associated with each other, in an image database 1800, described hereinafter with reference to FIG. 18. Note that the management system 101 registers information on the photographer who has photographed this image file in another database (not shown) different from the image database 1800 in a state associated with this image file. Note that the management system 101 can register the information on the photographer not in the other database, but in the image database 1800 in a state associated with this image file. The information on the photographer is, for example, an account name of this photographer in the management system 101 and authentication information used by the photographer in the user authentication when the photographing has been performed. Then, the management system 101 transmits a registration completion notification that the processing for registering the information on the image file in the blockchain is completed, to the image capturing apparatus 102 (step (3)).

Then, the management system 101 prompts the user to select an image file to be exhibited in an NFT-attached contents sales site 1601 from a plurality of image files registered in the image database 1800 (step (4)). Specifically, the user accesses a WEB page of the management system 101 from the communication apparatus 105a operated by this user and inputs the authentication information on the WEB page. Here, for example, in a case where the user is a photographer, this user inputs the same authentication information as the authentication information used in the step (1), on the WEB page. When the user authentication is successfully performed and the use of the NFT management function is permitted, the user can select an image file to be disclosed on the NFT-attached contents sales site 1601, from the communication apparatus 105a. Note that on the communication apparatus 105a, image files associated with the authentication information used in this user authentication, out of image files registered in the image database 1800, are displayed. That is, on the communication apparatus 105a, out of image files registered in the image database 1800, only image files generated by photographing performed by the user operating this communication apparatus 105a are displayed as selection candidates. Thus, in the present embodiment, only the photographer who is the creator of image files can exhibit the image files in the NFT-attached contents sales site 1601.

The management system 101 provides the image file selected by the user and the authenticity guarantee number associated with this image file to the NFT-attached contents sales site 1601 and makes an exhibition request (step (5)). Note that although in the present embodiment, the exhibition request is made by software, this exhibition request processing can be performed by manual input, and the method is not limited.

Figure 17:
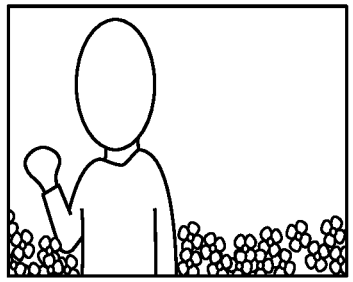
FIG. 17 is a diagram showing an example of the display of a URL for displaying a WEB page for confirmation, on which a procedure for confirming an NFT is described.

The NFT-attached contents sales site 1601 controls the display such that the authenticity guarantee number provided from the management system 101 together with the image file is displayed in the vicinity of an exhibition description field for the exhibited NFT-attached contents or the image of the contents on the WEB page. Note that the display position of the authenticity guarantee number is an example, and the authenticity guarantee number is only required to be displayed in a position where a viewing user of the NFT-attached contents sales site 1601 can recognize the authenticity guarantee number as the authenticity guarantee number associated with the image file. Further, at this time, not only the authenticity guarantee number, but also a procedure for confirming the NFT can be provided in the exhibition description field on the NFT-attached contents sales site 1601. For example, a URL 1701 appearing in FIG. 17 for displaying a WEB page for confirmation, on which the procedure for confirming the NFT is described, is displayed in the exhibition description field on the NFT-attached contents sales site 1601.

Further, upon receipt of the exhibition request, the NFT-attached contents sales site 1601 stores the image file and the metadata in a distributed storage. After that, the NFT-attached contents sales site 1601 generates transaction data including an owner e-mail address of the image file, a token URI (URI of the storage storing the image file and the metadata), and so forth, and connects a block in which the generated transaction data has been written, to the blockchain. Specifically, the NFT-attached contents sales site 1601 issues the generated transaction data to broadcast the transaction data to one or more computers (nodes) participating in a peer-to-peer network 1602 of the blockchain (step (6)). After that, the NFT-attached contents sales site 1601 transmits an exhibition completion notification and NFT-related information to the management system 101 (step (7)). The NFT-related information includes a token ID for uniquely identifying the NFT, a contract address, the URL of the NFT-attached contents sales site 1601, an account name of an exhibitor in the NFT-attached contents sales site 1601, and so forth.

The management system 101 registers the received NFT-related information in the image database 1800 in a state associated with the block ID, the authenticity guarantee number, the image file name, and so forth. At the same time, the management system 101 notifies the communication apparatus 105a that the image file selected by the user (step (4)) has been exhibited on the NFT-attached contents sales site 1601 (step (8)).

There is a case where a viewing user of the NFT-attached contents sales site 1601 desires to confirm whether or not an image file displayed on the WEB page of the NFT-attached contents sales site 1601 is truly the one exhibited by the photographer. In this case, first, the viewing user acquires (downloads) the image file and the authenticity guarantee number associated with this image file from the NFT-attached contents sales site 1601 by using the communication apparatus 105b (step (9)). Specifically, the viewing user accesses the WEB page of the NFT-attached contents sales site 1601 from the communication apparatus 105b, selects an image file disclosed on the WEB page, and gives an instruction for downloading the selected image file. Upon receipt of this instruction, the NFT-attached contents sales site 1601 transmits the selected image file and the authenticity guarantee number to the communication apparatus 105b.

When the download is completed, the communication apparatus 105b transmits a request for confirming the NFT of the image file to the management system 101 together with the acquired image file and authenticity guarantee number (step (10)). In the present embodiment, the NFT confirmation request is performed by attaching the image file and the authenticity guarantee number, which have been acquired from the NFT-attached contents sales site 1601, to an entry form provided by the management system 101, by the viewing user using the communication apparatus 105b.

However, the method of the NFT confirmation request is not limited to the method used in the present embodiment, but, for example, the NFT confirmation request can be performed by transmitting an email to which the image file and the authenticity guarantee number are attached, to the management system 101.

When the NFT confirmation request is transmitted from the communication apparatus 105b, the management system 101 performs confirmation of the NFT of the image file as the target of the NFT confirmation request. Note that although in this example, the NFT confirmation is performed when the management system 101 receives the NFT confirmation request with respect to the image file displayed on the NFT-attached contents sales site 1601 from the communication apparatus 105b of the viewing user of the NFT-attached contents sales site 1601, this is not limitative. For example, the management system 101 can periodically perform the NFT confirmation based on the image database 1800. If a result of the authenticity determination indicates authenticity, the management system 101 displays the NFT-related information acquired from the image database 1800 on the WEB page of the management system 101 or notifies the communication apparatus 105b of the NFT-related information by e-mail (step (11)).

FIG. 18 is a diagram showing an example of the configuration of the image database 1800 included in the management system 101 according to the third embodiment. The configuration of the image database 1800 differs from the above-described configuration of the image database 407. Specifically, the image database 1800 is formed by block IDs 1801, authenticity guarantee numbers 1802, image file names 1803, image notification settings 1804, NFT contract addresses 1805, NFT token IDs 1806, NFT sales URLs 1807, and sales site account names 1808, which are associated with one another, as shown in FIG. 18.

The block IDs 1801, the authenticity guarantee numbers 1802, the image file names 1803, and the image notification settings 1804 are the same as the above-described block IDs 501, authenticity guarantee numbers 502, image file names 503, and image notification settings 504, respectively.

As an NFT contract address 1805, a contract address is set which is included in the NFT-related information notified from the NFT-attached contents sales site 1601 when exhibition of the image file has been completed.

As an NFT token ID 1806, a token ID is set which is included in the NFT-related information notified from the NFT-attached contents sales site 1601 when exhibition of the image file has been completed.

As an NFT sales URL 1807, a URL of the NFT-attached contents sales site 1601 is notified which is included in the NFT-related information notified from the NFT-attached contents sales site 1601 when exhibition of the image file has been completed, is set.

As a sales site account name 1808, an account name of an exhibitor in the NFT-attached contents sales site 1601 is set which is included in the NFT-related information notified from the NFT-attached contents sales site 1601 when exhibition of the image file has been completed.

FIG. 19 is a flowchart of an image file exhibition process performed by the management system 101 according to the third embodiment. The image file exhibition process in FIG. 19 is also realized by the controller 400 executing an associated program stored in a recording medium included in the computer as the component of the management system 101. The image file exhibition process in FIG. 19 is executed, for example, when the user (for example, a photographer) accesses the management system 101 from the communication apparatus 105a, and by operating the communication apparatus 105a, selects one of a plurality of image files registered in the image database 1800 after user authentication is successfully performed, and provides an instruction for transmitting the selected image file to the NFT-attached contents sales site 1601. The communication apparatus 105a having received this instruction transmits an NFT exhibition request to the management system 101.

Referring to FIG. 19, first, the controller 400 receives an NFT exhibition request from the communication apparatus 105a operated by the user via the data reception section 401 (step S1901). This NFT exhibition request includes a block ID associated with an image file selected by the user.

Then, the controller 400 acquires the image file as the target of the NFT exhibition request and the authenticity guarantee number of this image file from the image database 1800 (step S1902). Specifically, the controller 400 acquires the image file and the authenticity guarantee number, associated with the block ID included in the NFT exhibition request, from the image database 1800.

Then, the controller 400 requests the NFT-attached contents sales site 1601 to exhibit the acquired image file (step S1903). In the step S1903, the controller 400 controls the data transmission section 402 to transmit the acquired image file and authenticity guarantee number to the NFT-attached contents sales site 1601. The NFT-attached contents sales site 1601 performs the above-described processing in the step (6) in FIG. 16, and then transmits an exhibition completion notification and NFT-related information to the management system 101 in the step (7) in FIG. 16.

Then, the controller 400 receives the NFT-related information and the exhibition completion notification from the NFT-attached contents sales site 1601 (step S1904). Note that the NFT-related information includes, as described above, the contract address and the token ID for uniquely identifying the NFT, the URL of the NFT-attached contents sales site 1601, and the account name of the exhibitor in the NFT-attached contents sales site 1601. Note that the NFT-related information can include information other than these. Further, information, such as a name of the exhibitor and a company name, can be included in place of the account name of the exhibitor in the NFT-attached contents sales site 1601.

Then, the controller 400 registers the received NFT-related information in the image database 1800 in a state associated with the block ID, the authenticity guarantee number, and the image file name (step S1905).

Then, the controller 400 registers exhibition-related information in the blockchain (step S1906). Specifically, first, the transaction generation section 404 generates transaction data including the authenticity guarantee number, transmission information of the image file, the image data, information (such as a URL) indicating the transmission destination of the authenticity guarantee number, and the exhibition-related information, such as the above-mentioned NFT-related information. Next, the transaction generation section 404 broadcasts the transaction data to one or more computers (nodes) participating in the peer-to-peer network 1602 of the blockchain. When the broadcasted transaction data is approved by miners and the verification is completed, the block generation section 405 generates a block in which the verified transaction data has been written and connects the generated block to the blockchain.

Then, the controller 400 transmits a notification that the image file as the target of the NFT exhibition request has been exhibited on the NFT-attached contents sales site 1601 to the communication apparatus 105*a* of the user as the requesting source of the NFT exhibition request (step S1907), followed by terminating the present process.

As described above, in the image file exhibition process in FIG. 19, when an image file is transmitted from the management system 101 to the NFT-attached contents sales site 1601 according to an NFT exhibition request corresponding to a user's instruction, the user is notified that this image file has been exhibited on the NFT-attached contents sales site 1601. At the same time, the exhibition-related information on this image file is registered in the blockchain. With this, the user can grasp a use status of this image file.

Figure 20:
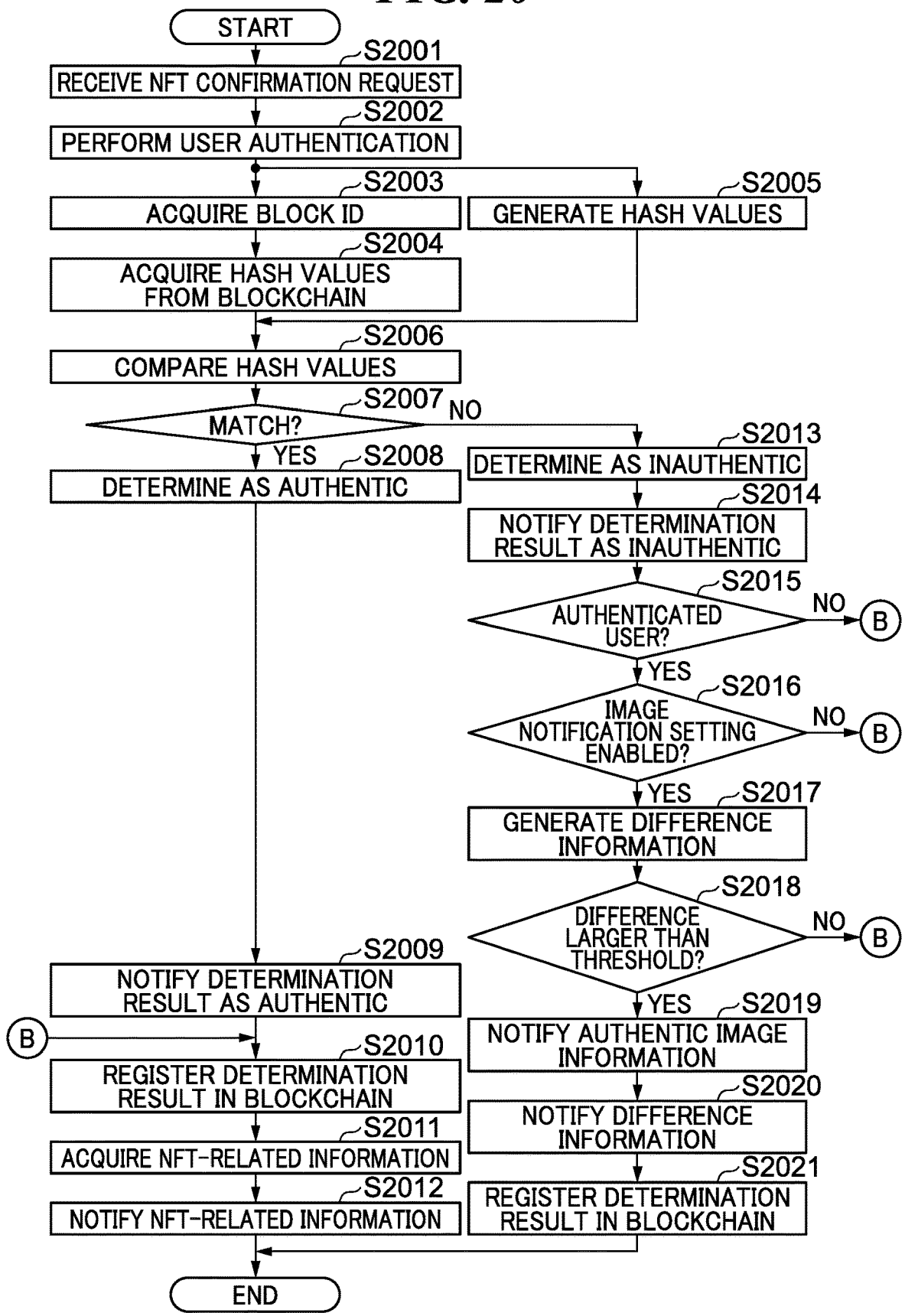
FIG. 20 is a flowchart of an NFT confirmation process performed by the management system according to the third embodiment.

FIG. 20 is a flowchart of an NFT confirmation process performed by the management system 101 according to the third embodiment. Note that the NFT confirmation process in FIG. 20 is a process similar to the above-described authenticity determination process in FIG. 9, and the following description will be given mainly of different points from the authenticity determination process in FIG. 9. Similar to the authenticity determination process in FIG. 9, the NFT confirmation process in FIG. 20 is also realized by the controller 400 executing an associated program stored in a recording medium included in the computer as the component of the management system 101. Although the following description will be given of a case where the NFT confirmation process in FIG. 20 is executed when a viewing user of the NFT-attached contents sales site 1601 makes a request for confirming the NFT of an image file sold on the NFT-attached contents sales site 1601 to the management system 101 by operating the communication apparatus 105*b* by way of example, the timing of execution of the NFT confirmation process in FIG. 20 is not limited to this. For example, the NFT confirmation process in FIG. 20 can be periodically executed based on the image database 1800.

Referring to FIG. 20, the controller 400 receives an NFT confirmation request from the communication apparatus 105*b* operated by the viewing user, via the data reception section 401 (step S2001). When receiving this request, the controller 400 also receives an image file as the target of the NFT confirmation and an authenticity guarantee number associated with this image file via the data reception section 401.

Then, in steps S2002 to S2007, the same processing operations as the steps S902 to S907 are executed.

If it is determined in the step S2007 that the two hash values match, the controller 400 determines the image file received in the step S2001 as "authentic" indicating that the image file has not been altered from the state at the time of generation thereof (step S2008). After that, the controller 400 controls the data transmission section 402 to notify "authenticity" as the result of the determination to the communication apparatus 105*b* as the requesting source of the NFT confirmation request (S2009). Then, the controller 400 registers the result of the determination in the step S2008 in the blockchain (step S2010). Specifically, the block generation section 405 generates a block in which the result of the determination in the step S2008 has been written and connects the generated block to the blockchain.

Then, the controller 400 inquires the image database 1800 by using the authenticity guarantee number received in the step S2001 as a key to thereby acquire the NFT-related information (step S2011). Specifically, the controller 400 acquires the NFT contract address 1805, the NFT token ID 1806, the NFT sales URL 1807, and the sales site account name 1808, which are associated with the authenticity guarantee number received in the step S2001, from the image database 1800.

Then, the controller 400 controls the data transmission section 402 to notify the result of the determination in the step S2008 and the NFT-related information to the communication apparatus 105*b* as the requesting source of the NFT confirmation request of (step S2012). On the display section 216 of the communication apparatus 105*b* having received this notification, for example, a message that the image file as the target has not been altered (is authentic) and the NFT-related information are displayed as shown in FIG. 21A (step S2012), followed by terminating the present process.

If it is determined in the step S2007 that the two hash values do not match, the controller 400 determines the image file received in the step S2001 as "inauthentic" indicating that the image file has been altered from the state at the time of generation thereof (step S2013). Then, in steps S2014 to S2021, the same processing operations as the steps S911 to S918 are executed. Note that on the display section 216 of the communication apparatus 105*b* having received the notification transmitted in the step S2020, for example, as shown in FIG. 21B, a message indicating that the image data has been altered, a transmitted image, an authentic image, and a difference image are displayed, and the NFT-related information is not displayed. After that, the present process is terminated.

As described above, in the present embodiment, the following process is performed in the management system 101: First, upon receipt of an image file and hash values obtained at the time of generation of the image file, an authenticity guarantee number for identifying the received image file is generated, and the received hash values are registered in the blockchain in a state associated with the authenticity guarantee number. Further, according to an instruction received from a creator of the image file associated with the hash values registered in the blockchain, the NFT-related information including information of this creator is registered in a state associated with the authenticity guarantee number of this image file. If it is determined that a result of the authenticity determination indicates authenticity, the NFT-related information associated with the authenticity guarantee number is notified. With this, a purchaser can easily know whether or not an image file exhibited in the NFT-attached contents sales site 1601 is the image file exhibited by the creator.

Further, in the present embodiment, the NFT-related information further includes information which can uniquely identify the NFT. The information which can uniquely identify the NFT is the token ID or the contract address. With this, a purchaser can easily know the information on the NFT of an image file exhibited in the NFT-attached contents sales site 1601.

Note that although in the NFT confirmation process in FIG. 20, the description has been given of the configuration in which the NFT-related information is notified only in a case where it is determined that a result of the authenticity determination indicates authenticity, this is not limitative. For example, in a case where it is determined that a result of the authenticity determination indicates inauthenticity, the NFT-related information can also be notified.

The present invention can also be realized by supplying a program that realizes one or more functions of the above-described embodiments to a system or an apparatus via a network or a storage medium, and causing one or more processors in the system or the apparatus to load and execute the program. Further, the present invention can also be realized by a circuit that realizes one or more functions (such as an ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-031655 filed Mar. 2, 2023, and Japanese Patent Application No. 2024-00176 filed Jan. 10, 2024, which are hereby incorporated by reference herein in their entirety.

What is claimed is:

1. A management system that manages contents associated with a hash value registered in a blockchain, comprising:
   at least one memory storing instructions; and
   at least one processor that, upon executing the stored instructions, performs the functions of:
   a reception unit configured to receive target contents as a target of authenticity determination and an identification number for identifying authentic contents used as a reference for determining authenticity of the target contents;
   a determination unit configured to determine the authenticity of the target contents by comparing a hash value which is generated from the target contents and a hash value of the authentic contents indicated by the identification number, which is registered in the blockchain; and
   a notification unit configured to perform notification of a result of the authenticity determination,
   wherein in a case where a determination is made that the target contents are not authentic, the notification unit performs notification of information on authentic contents associated with the identification number,
   wherein the target contents include predetermined data, a hash value of the predetermined data, and a signature value generated by encoding the hash value using a secret key,
   wherein the determination unit compares a hash value obtained by decoding the signature value using a public key and the hash value of the predetermined data included in the target contents and determines whether or not the hash value of the predetermined data has been altered,
   wherein the predetermined data includes image data generated through photographing, and thumbnail data generated by reducing the image data,
   wherein the determination unit determines whether or not the image data has been altered, after determining whether or not the thumbnail data has been altered, and
   wherein in a case where the determination unit determines that the thumbnail has not been altered and the image data has been altered, the notification unit performs notification of difference information obtained based on the thumbnail data and the image data.

2. The management system according to claim 1, wherein in the blockchain, reference address information of a server storing the authentic contents is registered, together with the hash value of the authentic contents, in a state associated with the identification number of the authentic contents, and
wherein the information on the authentic contents includes image data forming authentic contents acquired from the server indicated by the reference address information.

3. The management system according to claim 1, wherein the notification unit displays the information on the authentic contents associated with the identification number on a WEB page of the management system.

4. The management system according to claim 1, wherein the notification unit transmits the information on the authentic contents associated with the identification number to a transmission source of the target contents by e-mail.

5. The management system according to claim 1, wherein the notification unit further performs notification of difference information between the target contents and the authentic contents associated with the identification number.

6. The management system according to claim 1, wherein in a case where a determination is made that the target contents are not authentic, and a difference between the target contents and the authentic contents associated with the identification number is larger than a predetermined value set in advance, the notification unit performs notification of the information on the authentic contents associated with the identification number.

7. The management system according to claim 1, wherein in a case where a determination is made that the target contents are authentic, the notification unit performs notification of information indicating that the target contents are authentic, without performing notification of the information on the authentic contents associated with the identification number.

8. The management system according to claim 1, wherein the notification unit controls whether or not to perform notification of the information on the authentic contents associated with the identification number, based on a notification setting set by a user.

9. The management system according to claim 1, further comprising an authentication unit configured to perform user authentication, and
wherein in a case where a determination is made that the target contents are not authentic, and the user authentication has been successfully performed by the authentication unit, the notification unit performs notification of the information on the authentic contents associated with the identification number.

10. The management system according to claim 1, wherein the target contents are non-fungible token-attached contents.

11. The management system according to claim 10, further comprising a registration unit configured to register, according to an instruction received from a creator of the contents associated with the hash value registered in the blockchain, non-fungible token-related information including information on the creator in a state associated with an identification number for identifying the contents associated with the hash value registered in the block chain, and
wherein in a case where a determination is made that the target contents are authentic, the notification unit performs notification of the non-fungible token-related information associated with the identification number for identifying the contents associated with the hash value registered in the block chain.

12. The management system according to claim 11, wherein the target contents are contents sold in a non-fungible token-attached contents sales site.

13. The management system according to claim 12, wherein the non-fungible token-related information further includes uniform resource locator (URL) information for accessing the non-fungible token-attached contents sales site.

14. The management system according to claim 12, further comprising an authentication unit configured to perform user authentication, and
a selection unit configured to prompt a user who has been successfully authenticated in the user authentication to select contents to be exhibited in the non-fungible token-attached contents sales site from contents which are associated with hash values registered in the blockchain and are created by the user who has been successfully authenticated.

15. The management system according to claim 11, wherein the registration unit registers the non-fungible token-related information in a blockchain.

16. The management system according to claim 11, wherein the non-fungible token-related information further includes information which can uniquely identify a non-fungible token.

17. The management system according to claim 16, wherein the information which can uniquely identify the non-fungible token is a token identification (token ID) or a contract address.

18. A communication apparatus comprising:
at least one memory storing instructions; and
at least one processor that, upon executing the stored instructions, performs the functions of:
a reception unit configured to receive target contents formed by a plurality of data items and an identification number for identifying authentic contents used as a reference to determine authenticity of the target contents;
a determination unit configured to determine whether or not the target contents have been altered, based on the plurality of data items; and
a notification unit configured to perform notification of a result of the determination performed by the determination unit,
wherein in a case where a determination is made that the target contents have not been altered, the notification unit performs notification of a result of the determination based on the plurality of data items, whereas in a case where a determination is made that the target contents have been altered, the notification unit performs notification of a result of the determination based on information on the authentic contents acquired from a management system that manages the authentic contents,
wherein the plurality of data items include predetermined data, a hash value of the predetermined data, and a signature value generated by encoding the hash value using a secret key,
wherein the determination unit compares a hash value obtained by decoding the signature value using a public key and the hash value of the predetermined data included in the target contents and determines whether or not the hash value of the predetermined data has been altered,
wherein the predetermined data includes image data generated through photographing, and thumbnail data generated by reducing the image data,
wherein the determination unit determines whether or not the image data has been altered, after determining whether or not the thumbnail data has been altered, and wherein in a case where the determination unit determines that the thumbnail has not been altered and the image data has been altered, the notification unit performs notification of difference information obtained based on the thumbnail data and the image data.

19. The communication apparatus according to claim 18, wherein the information on the authentic contents is managed by using a blockchain.

20. The communication apparatus according to claim 18, wherein the determination unit compares a hash value obtained by applying a hash function to the predetermined data and the hash value of the predetermined data included in the target contents and determines whether or not the predetermined data included in the target contents has been altered.

21. The communication apparatus according to claim 18, further comprising:
an inquiry unit configured to inquire authentic data of data determined by the determination unit as altered, to the management system, using the identification number, and
a restoration unit configured to restore the data determined by the determination unit as altered, based on the authentic contents acquired from the management system.

22. The communication apparatus according to claim 18, wherein the predetermined data includes first metadata including attribute information obtained at the time of photographing the image data and second metadata including attribute information which is changed at the time of editing the image data,
wherein the determination unit determines whether or not the second metadata has been altered after determining whether or not the first metadata has been altered, and
wherein in a case where the determination unit determines that the first metadata has not been altered and the second metadata has been altered, the notification unit performs notification of difference information obtained based on the first metadata and the second metadata.

23. A method of managing contents associated with a hash value registered in a blockchain, comprising:
receiving target contents as a target of authenticity determination and an identification number for identifying authentic contents used as a reference for determining authenticity of the target contents;
determining the authenticity of the target contents by comparing a hash value which is generated from the target contents and a hash value of the authentic contents indicated by the identification number, which is registered in the blockchain; and
performing notification of a result of the authenticity determination,
wherein said performing notification includes, in a case where a determination is made that the target contents are not authentic, performing notification of information on authentic contents associated with the identification number,
wherein the target contents include predetermined data, a hash value of the predetermined data, and a signature value generated by encoding the hash value using a secret key,
wherein the determining comprises comparing a hash value obtained by decoding the signature value using a public key and the hash value of the predetermined data included in the target contents and determining whether or not the hash value of the predetermined data has been altered,
wherein the predetermined data includes image data generated through photographing, and thumbnail data generated by reducing the image data,
wherein the determining comprises determining whether or not the image data has been altered, after determining whether or not the thumbnail data has been altered, and
wherein in a case where a determination is made that the thumbnail has not been altered and the image data has been altered, the notification includes notification of difference information obtained based on the thumbnail data and the image data.

24. A method of controlling a communication apparatus, comprising:
receiving target contents formed by a plurality of data items and an identification number for identifying authentic contents used as a reference to determine authenticity of the target contents;
determining whether or not the target contents have been altered, based on the plurality of data items; and
performing notification of a result of the determination,
wherein said performing notification includes, in a case where a determination is made that the target contents have not been altered, performing notification of a result of the determination based on the plurality of data items, whereas in a case where a determination is made that the target contents have been altered, performing notification of a result of the determination based on information on the authentic contents acquired from a management system that manages the authentic contents,
wherein the plurality of data items include predetermined data, a hash value of the predetermined data, and a signature value generated by encoding the hash value using a secret key,
wherein the determining comprises comparing a hash value obtained by decoding the signature value using a public key and the hash value of the predetermined data included in the target contents and determining whether or not the hash value of the predetermined data has been altered,
wherein the predetermined data includes image data generated through photographing, and thumbnail data generated by reducing the image data,
wherein the determining comprises determining whether or not the image data has been altered, after determining whether or not the thumbnail data has been altered, and
wherein in a case where a determination is made that the thumbnail has not been altered and the image data has been altered, the notification includes notification of difference information obtained based on the thumbnail data and the image data.

25. A non-transitory computer-readable storage medium storing a program for causing a computer to execute a method of managing contents associated with a hash value registered in a blockchain,
wherein the method comprises:
receiving target contents as a target of authenticity determination and an identification number for identifying authentic contents used as a reference for determining authenticity of the target contents;
determining the authenticity of the target contents by comparing a hash value which is generated from the target contents and a hash value of the authentic contents indicated by the identification number, which is registered in the blockchain; and performing notification of a result of the authenticity determination, wherein said performing notification includes, in a case where a determination is made that the target contents are not authentic, performing notification of information on authentic contents associated with the identification number, wherein the target contents include predetermined data, a hash value of the predetermined data, and a signature value generated by encoding the hash value using a secret key, wherein the determining comprises comparing a hash value obtained by decoding the signature value using a public key and the hash value of the predetermined data included in the target contents and determining whether or not the hash value of the predetermined data has been altered, wherein the predetermined data includes image data generated through photographing, and thumbnail data generated by reducing the image data, wherein the determining comprises determining whether or not the image data has been altered, after determining whether or not the thumbnail data has been altered, and wherein in a case where a determination is made that the thumbnail has not been altered and the image data has been altered, the notification includes notification of difference information obtained based on the thumbnail data and the image data.

26. A non-transitory computer-readable storage medium storing a program for causing a computer to execute a method of controlling a communication apparatus,
wherein the method comprises:
receiving target contents formed by a plurality of data items and an identification number for identifying authentic contents used as a reference to determine authenticity of the target contents;

determining whether or not the target contents have been altered, based on the plurality of data items; and performing notification of a result of the determination, wherein said performing notification includes, in a case where a determination is made that the target contents have not been altered, performing notification of a result of the determination based on the plurality of data items, whereas in a case where a determination is made that the target contents have been altered, performing notification of a result of the determination based on information on the authentic contents acquired from a management system that manages the authentic contents wherein the plurality of data items include predetermined data, a hash value of the predetermined data, and a signature value generated by encoding the hash value using a secret key, wherein the determining comprises comparing a hash value obtained by decoding the signature value using a public key and the hash value of the predetermined data included in the target contents and determining whether or not the hash value of the predetermined data has been altered, wherein the predetermined data includes image data generated through photographing, and thumbnail data generated by reducing the image data, wherein the determining comprises determining whether or not the image data has been altered, after determining whether or not the thumbnail data has been altered, and wherein in a case where a determination is made that the thumbnail has not been altered and the image data has been altered, the notification includes notification of difference information obtained based on the thumbnail data and the image data.

* * * * *